(12) United States Patent
Wnendt

(10) Patent No.: US 11,723,358 B2
(45) Date of Patent: *Aug. 15, 2023

(54) CONTAINER SYSTEM FOR TRANSPORT OF BIOLOGICAL MATERIAL, USES THEREOF AND METHODS OF PACKAGING

(71) Applicant: MLM Medical Labs GmbH, Mönchengladbach (DE)

(72) Inventor: Stephan Wnendt, Aachen (DE)

(73) Assignee: MLM Medical Labs GmbH, Mönchengladbach (DE)

( * ) Notice: Subject to any disclaimer, the term of this patent is extended or adjusted under 35 U.S.C. 154(b) by 461 days.

This patent is subject to a terminal disclaimer.

(21) Appl. No.: 16/902,955

(22) Filed: Jun. 16, 2020

(65) Prior Publication Data

US 2020/0352158 A1 Nov. 12, 2020

Related U.S. Application Data

(63) Continuation of application No. 15/612,793, filed on Jun. 2, 2017, now Pat. No. 10,687,527.

(Continued)

(30) Foreign Application Priority Data

Jun. 3, 2016 (DE) .......................... 102016006883.3
Jun. 3, 2016 (DE) ............................. 202016003568

(51) Int. Cl.
*A01N 1/02* (2006.01)
*B01L 3/00* (2006.01)
(Continued)

(52) U.S. Cl.
CPC ............ *A01N 1/0273* (2013.01); *A61J 1/065* (2013.01); *A61J 1/1468* (2015.05); *A61J 1/16* (2013.01);
(Continued)

(58) Field of Classification Search
CPC ....... A01N 1/0273; A61J 1/065; A61J 1/1468; A61J 1/16; A61J 2200/50; B01L 3/50851;
(Continued)

(56) References Cited

U.S. PATENT DOCUMENTS 6,336,340 B1 1/2002 Laby
10,687,527 B2 * 6/2020 Wnendt ............. B65D 81/3823
(Continued)

FOREIGN PATENT DOCUMENTS

DE 10155150 A1 5/2003
WO WO-2014206531 A1 12/2014

OTHER PUBLICATIONS

Concise explanation of the relevance: English translation of title and abstract of DE10155150.

*Primary Examiner* — Benjamin R Whatley
*Assistant Examiner* — Jacqueline Brazin
(74) *Attorney, Agent, or Firm* — Julie K. Staple; Dinsmore & Shohl LLP

(57) ABSTRACT

The invention relates to a container system for transport of biological material comprising a container casing and an insulating device, wherein the container casing defines a container interior space for accommodation of the insulating device and for accommodation of biological material to be transported, and wherein the insulating device is constituted of at least two insulating portions, which are formed so as to surround the biological material inside the container interior space. The invention further relates to uses of such a container system for packaging and transport of biological material, as well as methods of packaging biological material for transport.

16 Claims, 22 Drawing Sheets

Related U.S. Application Data

(60) Provisional application No. 62/345,080, filed on Jun. 3, 2016.

(51) Int. Cl.
  *B01L 7/04* (2010.01)
  *B65D 81/38* (2006.01)
  *A61J 1/14* (2023.01)
  *A61J 1/06* (2006.01)
  *A61J 1/16* (2023.01)

(52) U.S. Cl.
  CPC ............ *B01L 3/50851* (2013.01); *B01L 7/04* (2013.01); *B65D 81/3823* (2013.01); *A61J 2200/50* (2013.01); *B01L 2200/185* (2013.01); *B01L 2300/04* (2013.01); *B01L 2300/0809* (2013.01); *B01L 2300/12* (2013.01)

(58) Field of Classification Search
  CPC .. B01L 7/04; B01L 2200/185; B01L 2300/04; B01L 2300/0809; B01L 2300/12; B65D 81/3823
  USPC ....................................... 435/307.1
  See application file for complete search history.

(56) References Cited

U.S. PATENT DOCUMENTS

| | | |
|---|---|---|
| 2003/0012701 A1 | 1/2003 | Sangha et al. |
| 2008/0208158 A1 | 8/2008 | Goodman et al. |
| 2010/0272669 A1 | 10/2010 | Malessa et al. |
| 2012/0305435 A1 | 12/2012 | Matta et al. |
| 2015/0225158 A1 | 8/2015 | Lyzenga et al. |

* cited by examiner

CONTAINER SYSTEM FOR TRANSPORT OF BIOLOGICAL MATERIAL, USES THEREOF AND METHODS OF PACKAGING

REFERENCE TO RELATED APPLICATIONS

This application is a continuation of U.S. patent application Ser. No. 15/612,793, filed Jun. 2, 2017, which claims priority from U.S. Provisional Patent Application Ser. No. 62/345,080, filed Jun. 3, 2016 and German Patent Application No. 102016006883.3, filed Jun. 3, 2016 and German Utility Model Application No. 202016003568, filed Jun. 3, 2016. The entire content of all of which is incorporated herein by reference.

FIELD OF THE INVENTION

The invention relates to a container system for transport of biological material. The invention also relates to uses of such a container system for packaging and for transport of biological material, as well as to methods of packaging biological material for transport.

BACKGROUND OF THE INVENTION

Biological materials, such as blood and tissue samples, are collected in at various locations, for example in medical practices or hospitals, and are then sent to diagnostic and research laboratories, or to private and public tissue and blood banks. Biological material is an increasingly important resource for medical diagnostics and research. With the introduction of new biotechnological and molecular genetic testing possibilities, the potential and scope of the information derived from biological material is continually expanding. The volume of biological samples obtained, collected and transported for diagnostic purposes is therefore steadily increasing.

Because of the distance between sender and recipient location, biological material is often shipped overnight. On the other hand, clinical investigations are also often carried out on the day of sample taking by local laboratories. By changing outdoor temperatures, which are associated with transports both overnight and during the day, the respective biological material may be subjected to significant temperature stress. This may adversely affect the quality of the clinical data obtained from the samples. In particular, temperature stress can lead to a pronounced instability of many typical parameters in hematology, clinical chemistry and coagulation.

The disclosure of WO2014/206531 relates to a device and a method for storing and transport of a body fluid sample. Information about the influence of fluctuating outside temperatures on each of the body fluid sample to be transported does not emerge from this art.

Furthermore, transport containers are known to be operated with dry ice as temperature-insulating material. However, dry ice sublimes during use and must be refilled before the respective container system can be used again. This is associated with high costs and a significant work effort. Further, it should be noted that a number of parameters, for example many parameters in hematology, cannot be determined when the blood sample has been frozen. As a result, the scope of application of transport containers with dry ice is limited.

Other transport containers are operated with electric heating or cooling devices for maintaining a desired temperature inside the container. Such transport containers may be susceptible to failure of the respective heating or cooling device, thus endangering operational safety. Furthermore, the scope of application is restricted due to the required electrical energy, and the electrical energy in mobile use creates high costs.

Furthermore, transport containers which are operated with dry ice or electric heating or cooling devices have a considerable weight, which is associated with a considerable handling effort and high freight charges for transport.

Provided according to aspects described herein is a container system for transport of biological material, wherein the container system reduces influences of changing outdoor temperatures on the biological material to be transported with reduced effort, is flexible in use and at the same time easy to handle. Also provided are uses of an inventive container system as well as methods of packaging.

SUMMARY OF THE INVENTION

The quintessence of the container system of the invention is a container casing with an insulating device, wherein the container casing defines a container interior space for accommodating the insulating device and for accommodating biological material to be transported. The insulating device is constituted by at least two insulating portions, which are formed to enclose the biological material to be transported inside the container interior space.

Such a container system effectively protects the material to be transported against thermal stress and thus contributes, in a surprising manner, to the quality of the biological data obtained from the biological material. It is decisive that the biological material can be at least section-wise, preferably completely, surrounded during the transport by the insulating portions, thereby appropriately buffering influences due to temperature fluctuations. The thermal influence can be minimized due to surrounding of the biological material to be transported. In particular, the inventors have found that in a container system according to the invention the temperature stress on the biological material to be transported can be significantly reduced, thereby improving the stability of typical parameters in hematology, clinical chemistry or coagulation.

Furthermore, the container system of the present invention allows it to be used without prior cooling of the insulating device in a refrigerator, and to be re-used without filling with new cooling material, and thus can be operated sustainably. Likewise, the transport operation can be conducted free of electrical energy, thereby reducing the operating costs and at the same time increasing operational safety.

According to a preferred embodiment, the at least two insulating portions are formed and/or dimensioned for the adjacent arrangement within the container interior space, thereby simplifying the positionability within the container interior space. The insulating portions are preferably connected to one another, which ensures simple handling of the insulating device while at the same time securely enclosing the transport material. The insulating sections are, particularly preferably, formed integrally with one another, wherein the insulating portions are, preferably, foldable along an interruption section. Such an embodiment can be produced at low cost and is at the same time advantageously handable. Particularly preferably, the length and/or the width of an insulating portion are matched to the corresponding dimensions of the container interior space. Accordingly, the length and/or width of an insulating portion may substantially correspond to the length and/or width of the container interior space. This prevents slipping of the respective insulating portion. By connecting the two insulating portions, a correct fit is additionally ensured.

According to a further embodiment, the insulating device is formed as a temperature-insulating gel cushion. In another embodiment, the insulating sections are in each case formed as temperature-insulating gel cushions. Gel cushions of this kind are inexpensive in manufacture, easy to handle and ensure a reliable insulating effect.

In further embodiments, the at least two insulating portions are each formed by at least one gel chamber. Preferably, the at least two insulating portions are each formed by a gel chamber. In various embodiments, the at least two insulating portions can each be positioned along a plane, thereby simplifying the enclosing of the material to be transported.

Preferably, the at least two insulating portions are in each case formed by at least one gel chamber and can be positioned in each case along a plane, the interruption section in each case separating two mutually adjacent gel chambers from one another. The interruption section can be unfilled or at least have a lower degree of filling than at least one of the gel chambers. The degree of filling should be understood here as the volume of the filling relative to the available filling volume of the respective chamber. The filling of the interruption section may, but need not, correspond to the filling of the at least two insulating portions. In preferred embodiments, the interruption section has a lower degree of filling than at least one of the gel chambers, in particular one of the two adjacent gel chambers separated from one another by the interruption section.

In particularly preferred embodiments, the interruption section is unfilled, thereby enabling particularly easy folding along the interruption section.

In an advantageous embodiment, the insulating device is formed of a thermoplastic resin, preferably from polyethylene or LDPE (low density polyethylene).

In one embodiment, the at least two insulating portions of the insulating device are at least two temperature-insulating bags or cushions, which are preferably flexible and which contain a temperature-insulating gel. In an advantageous embodiment, the temperature-insulating gel cushion has a shell made of a thermoplastic resin, preferably polyethylene or LDPE (low density polyethylene). The insulating device and/or its insulating portions, or the gel cushion and the gel chambers, respectively, advantageously contain a hydrocolloidal material, preferably a water-based gel, using polyacrylic acid, aluminum silicates and/or methylcellulose for gel formation (thickening agents). In one embodiment, the insulating device and/or its insulating portions comprise a thermoreversible hydrocolloidal material, preferably a hydrocolloid-forming thermoreversible gel. The gel matrix can be a superabsorbent polymer, which is mixed with water to form the gel matrix. Preferably, the insulating device and/or its insulating portions, or the gel cushion and the gel chambers, respectively, contain a polyacrylic acid-based gel matrix. In one embodiment, the heat-insulating gel is an acrylic acid polymer (polyacrylic acid, sodium salt thereof), water and zeolites (crystalline aluminum silicates). In a preferred embodiment, the heat-insulating gel consists of >=85% acrylic acid polymer (polyacrylic acid; sodium salt thereof), water and zeolites (crystalline aluminum silicates). In another embodiment, the heat-insulating gel consists of acrylic acid polymer (sodium salt thereof), water, zeolites (crystalline aluminum silicates), and silicon dioxide. In a preferred embodiment, the heat-insulating gel consists of >=85% acrylic acid polymer (sodium salt thereof), water, zeolites (crystalline aluminum silicates), and silicon dioxide. In a particularly preferred embodiment, the heat-insulating gel consists of >=85% acrylic acid polymer (sodium salt thereof), water, <1% zeolites (crystalline aluminum silicates), and <0.5% silicon dioxide. In another embodiment, the heat-insulating gel consists of >85% acrylic acid polymer (sodium salt thereof), <10% water, <1% zeolites (crystalline aluminum silicates), and <0.5% silicon dioxide.

It may also be advantageous to form the container casing from temperature-insulating polymer material, preferably from temperature-insulating plastic. In a particularly preferred embodiment, the container housing is formed from foamed polystyrene or polyurethane. In various embodiments, the container casing has at least section-wise a wall thickness of 5 to 25 mm, preferably 10 to 20 mm, more preferably 12.5 to 17.5 mm. The container casing particularly preferably has at least section-wise a wall thickness of 15 mm. In this way, on the one hand a high mechanical stability and an insulating effect of the casing is ensured, and on the other hand a material-saving production is made possible.

As an improvement to the embodiment, the dimensions of the container interior space substantially correspond to the dimensions of the insulating device, preferably in the folded state of the insulating portions, in order to keep the insulating device and/or the respective insulating portions positionally secure.

In advantageous embodiments, the container housing consists of at least one bottom part and at least one upper part closing the lower part. In one embodiment, the bottom part and/or the upper part are each formed from at least one raised side wall and a bottom area as a one-piece form part. The bottom part and the upper part can be formed as integrally connected elements. In one embodiment, the bottom part is formed with the upper part as a one-piece form part. Preferably, the bottom part and the upper part are formed as separate elements.

In a further improvement of the embodiment, the upper part is formed with a recess, at least section-wise extending circumferentially, for receiving an at least section-wise circumferentially extending projection of the bottom part, and/or wherein the bottom part is formed with a projection, at least section-wise extending circumferentially, for engaging in a recess of the upper part, at least section-wise extending circumferentially. By means of such a configuration, a secure closure of the container casing can be ensured with simple means.

In the container system according to the invention, a closable receptacle for at least one biological material to be transported may be foreseen. In one embodiment, the closable receptacle is a sample bag, preferably a leak-tight sample bag. Preferably, the dimensions of the closable receptacle and/or the dimensions of at least one insulating portion are formed for covering the closable receptacle by an insulating portion. Particularly preferably, the dimensions of the closable receptacle and/or the dimensions of at least one insulating portion for covering the closable receptacle by an insulating portion are formed in such a way that the receptacle is completely surrounded by the at least two insulating portions of the insulating device.

The present invention provides the use of a container system according to the invention for packaging biological material. In an advantageous embodiment, the gel cushion is adjusted to room temperature in the use according to the invention.

The present invention further provides methods for packaging biological material for transport, comprising the steps of: (i) Providing a container system as described above; and (ii) packaging the biological material to be transported between the insulating portions of the insulating device in the container casing.

The present invention also provides methods for transporting biological material, comprising the steps of: (i) Providing a container system as described above; and (ii) Packaging the biological material to be transported between the insulating portions of the insulating device in the container casing.

In one embodiment, the biological material is human or animal body material. Preferably, the human or animal body material is human or animal body fluid. In a more preferred embodiment, the biological material is at least a sample of human or animal blood, plasma, serum, sputum, saliva, or liquor. In a particularly preferred embodiment, the biological material is at least a human or animal blood sample. However, the present invention also encompasses biological material, which is a self-donation sample of blood. In another embodiment, the biological material is a sperm sample. In a further embodiment, the biological material is material, which is not "taken" from a patient, but which are body excretions. In a preferred embodiment, the biological material is at least a human or animal urine sample. In another embodiment, the biological material may be body material which is obtained, for example, from the afterbirth, e.g., placenta or umbilical cord or umbilical cord blood. In another embodiment, the biological material is at least a human or animal tissue sample. In a preferred embodiment, the tissue sample is tissue from medically indicated biopsies. These can be medically indicated biopsies of various organs. In a preferred embodiment, the biological material is tissue of surgical material, preferably tumors of different tissues. In one embodiment, the biological material is a biological sample.

Further embodiments of the present invention result from combinations of the features disclosed in the claims, the description as well as the figures. The present invention is explained in more detail below with reference to exemplary embodiments and associated drawings.

BRIEF DESCRIPTION OF THE DRAWINGS

FIG. 9A shows the temperature profile of a conventional cardboard box, and FIG. 9B shows the temperature profile of a container system according to the invention. In both cases, at the time point t=2 h, the temperature was increased from 22° C. (room temperature) to 50° C. for a period of three hours (3 h). A rapid temperature increase to a maximum temperature of 50° C. was measured in the conventional cardboard box. In the container system according to the invention, a slow temperature rise was observed, and the maximum temperature in the container interior was only 33° C. FIG. 9C shows the direct comparison of the temperature profiles of the conventional cardboard box of FIG. 9A and the container system according to the invention of FIG. 9B. The temperature measurement took place between the insulating portions (gel cushions), i.e., in the area surrounded by the insulating portions.

FIG. 13A shows the temperature change in a conventional cardboard box, and FIG. 13B shows the temperature change in a container system according to the invention. In both cases, at the time point t=2 h, the temperature was lowered from 22° C. (room temperature) to minus 27° C. (−27° C.) for a period of three hours (3 h). In the conventional cardboard box, a rapid temperature decrease was measured, to a minimum temperature of −27° C. (minus 27° C.). In the container system according to the invention, only a slow temperature decrease was observed, and the minimum temperature in the container interior was +4° C. FIG. 13C shows the direct comparison of the temperature profiles of the conventional cardboard box of FIG. 13A and the container system according to the invention of FIG. 13B. The temperature measurement took place between the insulating portions (gel cushions), i.e., in the area enclosed by the insulating portions.

DETAILED DESCRIPTION OF THE INVENTION

The present invention provides a container system for the transport of biological material which effectively protects the material to be transported against thermal stress, and thus surprisingly contributes to the quality of the biological data determined from the biological material.

Figure 1:
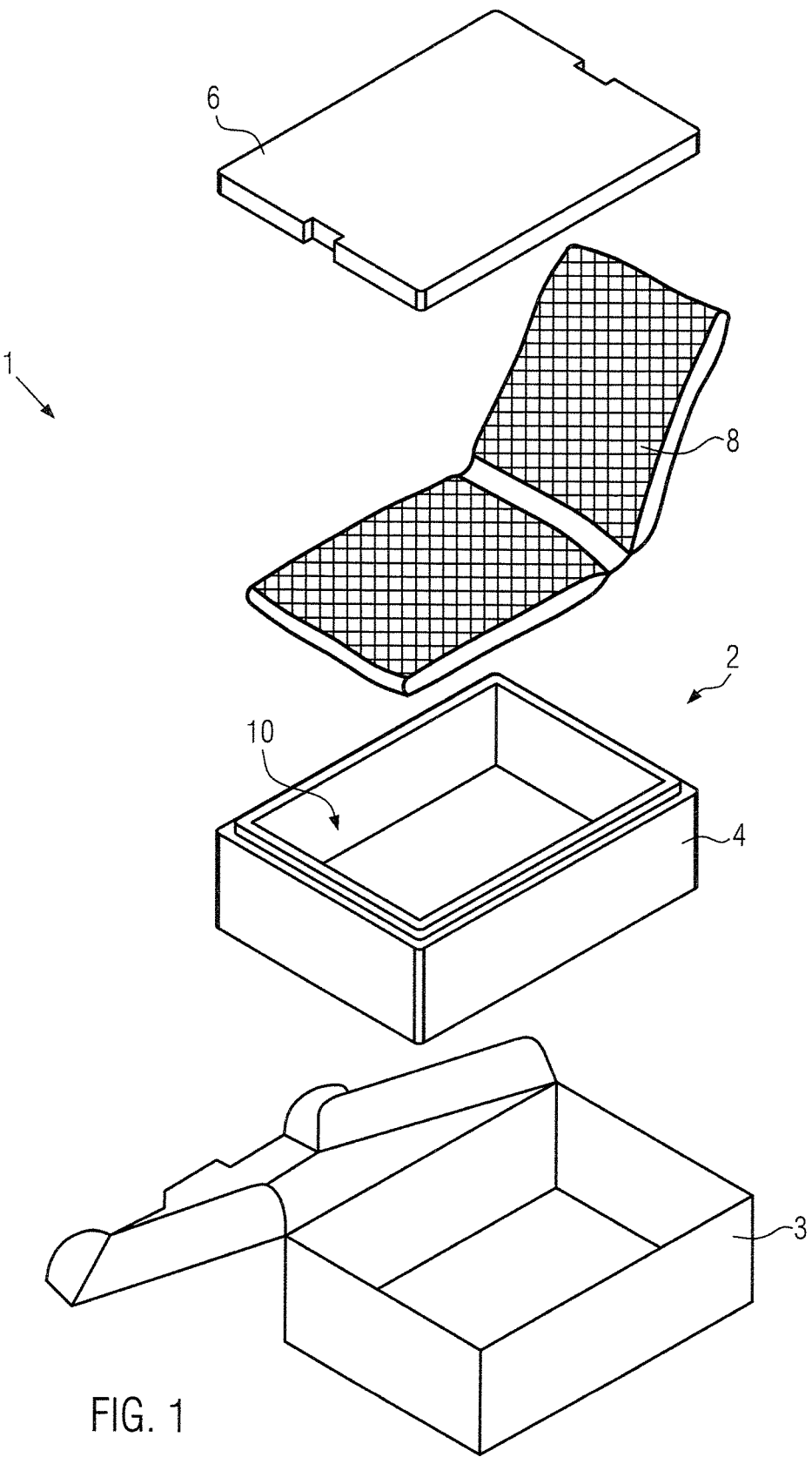
FIG. 1 shows an exploded view of a container system according to an embodiment of the present invention with upper part 6, insulating device 8 and bottom part 4. The container system primarily comprises the upper part 6, the insulating device 8 and the bottom part 4 and can optionally additionally comprise the outer packaging 3. The container casing 2 also comprises the bottom part 4 as well as the upper part 6.
Figure 2:
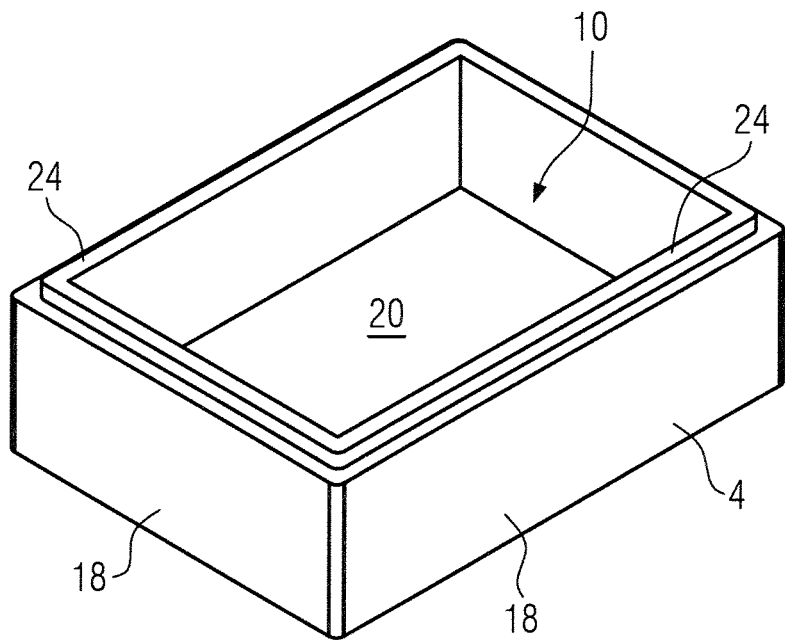
FIG. 2 shows a bottom part 4 of a container system according to an embodiment of the present invention.
Figure 3:
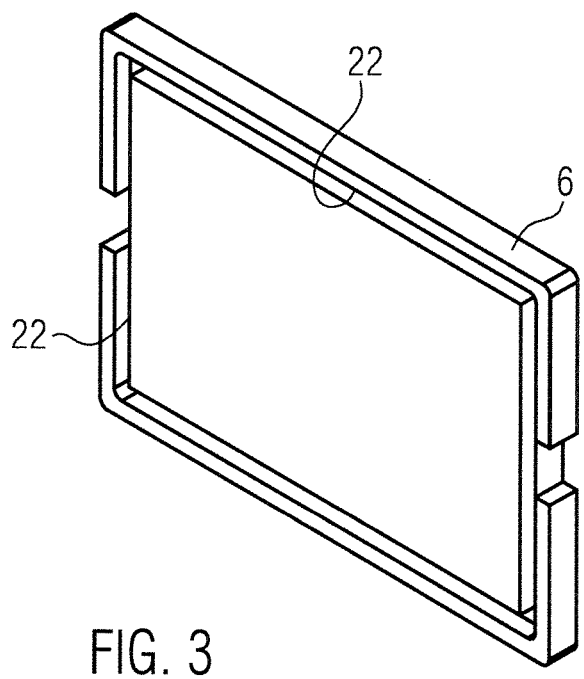
FIG. 3 shows a upper part 6 of a container system according to an embodiment of the present invention.

The exemplary container system 1 for the transport of biological material shown, in perspective, in FIG. 1 comprises a container casing 2 which may consist of, for example, the bottom part 4 shown in FIG. 2 and the upper part 6 shown in FIG. 3. Furthermore, the container system 1 according to FIG. 1 comprises an insulating device 8 (see also FIG. 4). The container system 1 according to FIG. 1 primarily comprises the upper part 6, the insulation device 8 and the bottom part 4, and can optionally also comprise the outer packaging 3. The container casing 2 of the container system 1 according to FIG. 1 comprises both the bottom part 4 and the upper part 6. In this case, the container casing 2 defines a container interior space 10 for accommodating the insulating device 8 and for accommodating biological material 12 to be transported (see FIGS. 5 to 8), wherein the insulating device 8 is formed by at least two insulating portions 14 (see also FIG. 4), which are formed for surrounding the biological material 12 to be transported within the container interior space 10. Preferably, the insulating device 8 and/or its insulating portions 14 are formed in such a way that the biological material 12 to be transported is completely surrounded within the container interior space 10. The container system 1 provided by the present invention serves to buffer temperature changes, which are caused by changing outdoor temperatures, in the container interior space 10, in particular in the area surrounded between the insulating portions 14. This is of particular importance in the transport of biological materials 12, which are sent for purposes of medical diagnostics and research.

With the numeral 12 ("biological material") reference is made in the figures to the exemplarily illustrated tubes, in which the biological material 12 is located, or in which the biological material to be transported is accommodated or collected. For transport, these tubes can be placed into a closable receptacle 26, which is illustrated by way of example in FIGS. 5-8. In other words, the reference numeral 12 indirectly describes the biological material, which is located in the collecting tubes illustrated by way of example.

In addition to the container casing 2, the container system 1 according to the invention is further characterized by an insulating device 8, which is formed by at least two insulating portions 14. The container casing 2 of the container system 1 according to the invention defines a container interior space 10 for accommodating the biological material 12 to be transported. These insulating sections 14 are formed to surround the biological material 12 to be transported within the container interior space 10; see also FIGS. 1 to 4 and 5 to 8, respectively.

In one embodiment, the at least two insulating portions 14 are formed and/or dimensioned for adjacent arrangement within the container interior space 10.

As a further improvement of the embodiment, the insulating portions 14 are connected to one another and/or are integrally formed with one another. Preferably, the insulating portions 14 are foldable relative to one another along an interruption section 16.

In one embodiment, the at least two insulating portions 14 are formed and/or dimensioned for the adjacent arrangement within the container interior space 10, and/or connected with each other, and/or integrally formed with one another. Preferably, the insulating portions 14 are foldable relative to one another along an interruption section 16. The length of the interruption section is variable. Length here refers to the longitudinal axis of the insulating device 8. The interruption section 16 can have a length (in the longitudinal direction of the insulating device) of 0.5 cm to 10 cm. In various embodiments, the interruption section 16 has a length of approximately 1 cm to 9 cm, more preferably a length of 2 cm to 8 cm, even more preferably a length of 3 cm to 7 cm. In other embodiments, the interruption section 16 has a length of about 4 cm to 6 cm. In preferred embodiments, the interruption section 16 has a length of about 1 cm to 5 cm, i.e. a maximum length of 5 cm. In particularly preferred embodiments, the interruption section 16 has a length of about 1 cm to about 3.5 cm, more preferably a length of about 1.5 cm to about 3 cm, more preferably about 1.5 cm to about 2.5 cm. A length of approximately 2 cm has been proven to be particularly suitable for the interruption section 16. This embodiment has proved to be particularly suitable for transport of, e.g., of blood samples.

In various embodiments, the length of the interruption section 16 is selected such that the degree of compression of the at least two insulating portions 14 does not substantially change by folding along the interruption section 16. The length of the interruption section 16 is dependent, inter alia, on the biological material 12 to be transported. In particular, the length of the interruption section 16 is dependent on the dimensioning of the container casing 2, in particular its interior space 10, in which the biological material 12 to be transported is located and which is surrounded by the insulating portions 14 of the insulating device 8. However, the length of the interruption section 16 also depends on the quality or dimensioning of the insulating portions 14.

In one embodiment, the insulating device 8 is formed as a temperature-insulating gel cushion. Preferably, the at least two insulating portions 14 of the temperature-insulating gel cushion are formed and/or dimensioned for the adjacent arrangement within the container interior space 10. More preferably, the at least two insulating portions 14 of the temperature-insulating gel cushion are formed and/or dimensioned for the adjacent arrangement within the container interior space 10 and connected to one another, and/or are integrally formed with one another. Preferably, the at least two insulating portions 14 of the temperature-insulating gel cushion are foldable relative to one another along an interruption section 16.

In another embodiment, the insulating portions 14 are formed as temperature-insulating gel cushions. Preferably, the at least two insulating portions 14, which are formed as temperature-insulating gel cushions, are formed and/or dimensioned for the adjacent arrangement within the container interior space 10. More preferably, the at least two insulating portions 14, which are formed as temperature-insulating gel cushions of the temperature-insulating gel cushion, are formed and/or dimensioned for the adjacent arrangement within the container interior space 10, and are connected to one another and/or integrally formed with one another. Preferably, the at least two insulating portions 14, formed as temperature-insulating gel cushions, are formed to be foldable relative to one another along an interruption section 16.

In various embodiments, the at least two insulating portions 14 are each formed by at least one gel chamber. Preferably, the at least two insulating portions 14 are each formed by a gel chamber. In various embodiments, the at least two insulating portions 14 are each positionable along a plane. As an improvement of the embodiment, the at least two insulating portions 14 are each formed by at least one gel chamber and can be positioned each along a plane. Preferably, the at least two insulating portions 14 are each formed by at least one gel chamber and can be positioned each along a plane, wherein the interruption section 16 separates two mutually adjacent gel chambers from each other. The interruption sections may be unfilled, or may at least have a lower degree of filling than at least one of the gel chambers. The filling of the interruption section 16 may, but need not, correspond to the filling of the at least two insulating portions 14. In preferred embodiments, the interruption section 16 has a lower degree of filling than at least one of the gel chambers, in particular a lower degree of filling than one of the two adjacent gel chambers, which are separated by the interruption section 16.

In particularly preferred embodiments, the interruption section 16 is unfilled. In further preferred embodiments, the at least two insulating portions 14 are each formed by a gel chamber, and the interruption section 16 is unfilled.

In an advantageous embodiment, the insulating device 8 is designed as a temperature-insulating gel cushion, or the at least two insulating portions 14 of the insulating device 8 are each formed by at least one gel chamber, wherein the shell of the gel cushion or gel chambers is formed of a thermoplastic resin, preferably polyethylene or LDPE (low density polyethylene).

In one embodiment, the at least two insulating portions 14 of the insulating device 8 are at least two temperature-insulating bags or cushions, which are preferably flexible and which contain a temperature-insulating gel. In an advantageous embodiment, the heat-insulating gel cushion has a shell of a thermoplastic resin, preferably of polyethylene or LDPE (low density polyethylene).

The insulating device 8 and/or its insulating portions 14, or the gel cushion and/or the gel chambers, respectively, advantageously contain a hydrocolloidal material, preferably a water-based gel, using polyacrylic acid, aluminum silicates or methylcellulose for gel formation (as thickening agents). In one embodiment, the insulating device 8 and/or its insulating portions 14 include a thermoreversible hydrocolloidal material, preferably a hydrocolloid-forming thermoreversible gel. The gel matrix may be a superabsorbent polymer, which is mixed with water to form the gel matrix. Preferably, the insulating device 8 and/or its insulating portions 14, or the gel cushion and the gel chambers, respectively, contain a polyacrylic acid-based gel matrix. In one embodiment, the heat-insulating gel is an acrylic acid polymer (Na salt thereof), water, and zeolites (crystalline aluminum silicates). In a preferred embodiment, the heat-insulating gel consists of >=85% acrylic acid polymer (Na salt thereof), water and zeolites (crystalline aluminum silicates). In another embodiment, the heat-insulating gel consists of acrylic acid polymer (Na salt thereof), water, zeolites (crystalline aluminum silicates), and silicon dioxide. In a preferred embodiment, the heat-insulating gel consists of >=85% acrylic acid polymer (Na salt thereof), water, zeolites (crystalline aluminum silicates), and silicon dioxide. In a particularly preferred embodiment, the heat-insulating gel consists of >=85% acrylic acid polymer (Na salt thereof), water, <1% zeolites (crystalline aluminum silicates), and <0.5% silicon dioxide.

It has been shown that, in an advantageous embodiment, the container casing 2 is formed of temperature-insulating polymeric material, preferably of temperature-insulating plastic. In a preferred embodiment, the container casing 2 is formed of polystyrene or polyurethane, more preferably of polystyrene, in particular of foamed polystyrene.

In various embodiments, the container casing 2 has at least section-wise a wall thickness of 5 to 25 mm, preferably 10 to 20 mm, more preferably 12.5 to 17.5 mm. The container casing 2 particularly preferably has at least section-wise a wall thickness of 15 mm.

As an improvement to the embodiment, the dimensions of the container interior space 10 correspond substantially to the dimensions of the insulating device 8, preferably in folded state of the insulating portions 14, in order to keep the insulating device 8 and/or the respective insulating portions 14 positionally secure. In this case, the side walls 18 of the container casing 2 serve in particular as a boundary for the insulating device 8, which is then secured against slipping.

In advantageous embodiments, the container housing 2 consists of at least one bottom part 4 and at least one upper part 6, which closes the bottom part 4, as shown in FIGS. 1 to 3.

In one embodiment, the bottom part 4 and/or the upper part 6 are each formed from at least one raised side wall 18 and a bottom wall 20 as a one-piece molded part. The bottom part 4 and the upper part 6 may be formed as integrally connected elements, the upper part 6 being preferably arranged so as to be hinged relative to the bottom part 4. In one embodiment, the bottom part 4 is formed with the upper part 6 as a one-piece molded part. Preferably, the bottom part 4 and the upper part 6 are formed as separate elements. In one embodiment, the bottom part 4 has four elevated side walls 18 and a bottom wall 20. Preferably, the container casing 2 is cubic or rectangular shaped, and the bottom part 4 has four elevated side walls 18 and a bottom wall 20.

The upper part 6 may also consist of four raised side walls 18, which may be adapted to the corresponding side walls 18 of the bottom part 4. In a particularly preferred embodiment, the container casing 2 is rectangular shaped or cubic, and the bottom part 4 has four elevated side walls 18 and a bottom wall 20, and the upper part 6 is substantially flat, in particular free of elevated side walls. Here, the upper part 6 is formed, for example, as a cover lid.

Preferably, the upper part 6 closes off the bottom part 4 and is detachable from the bottom part 4 in order to obtain full access from the top to the container interior space 10 and the biological material 12, respectively. If the upper part 6 and/or the bottom part 4 each have four elevated side walls, the side walls 18 and the bottom wall 20 are each formed as a one-piece molded part.

As a further improvement of the embodiment, the upper part 6 is formed with a recess 22, at least section-wise extending circumferentially 24, for receiving an at least section-wise circumferentially extending projection 24 of the bottom part 4, and/or wherein the bottom part 4 is formed with a projection 24, at least section-wise extending circumferentially, for engaging in a recess 22 of the upper part 6, at least section-wise extending circumferentially.

In the container system 1 according to the invention, a closable receptacle 26 may be foreseen for at least one biological material 12 to be transported, or at least one tube to be transported and containing the biological material. In one embodiment, the closable receptacle 26 may be a sample bag, preferably a leak-tight sample bag. Preferably, the dimensions of the closable receptacle 26 and/or the dimensions of at least one insulating portion 14 are formed for covering the closable receptacle 26 by an insulating section 14. Particularly preferably, the dimensions of the closable receptacle 26, and/or the dimensions of at least one insulating portion 14 for covering of the closable receptacle 26 by an insulating section 14, are designed such that the closable receptacle 26 is completely surrounded by the at least two insulating portions 14 of the insulating device 8.

The inventive container system 1 not only protects the biological material 12 to be transported effectively against thermal stress, but also against mechanical stress and/or damage. This is achieved in particular by the fact that the insulating device 8 and/or the respective insulating portions 14 surround the biological material 12 to be transported within the container interior space 10. A further improvement for protection against mechanical stress and/or damage is provided when the dimensions of the container interior space 10 correspond substantially to the dimensions of the insulating device 8, preferably in the folded state of the insulating portions 14, in order to hold the insulating device 8 and/or the respective insulating portions 14 positionally secure.

In a further embodiment, the container system 1 according to the invention comprises an operating manual with instructions for packaging the biological material 12 in the container casing 2.

In a further embodiment, the container system 1 of the present invention comprises an outer package 3 for the container casing 2. Such an outer packaging 3 may be a commercially available cardboard box, into which the container casing 2 is packaged. Such an outer packaging serves, inter alia, as an additional protection of the container casing 2, and thus of the biological material 12 to be transported, against mechanical stress and/or damage.

In various embodiments, the container system 1 of the present invention may be provided with markings and/or labels. Such markings and/or labels may be, in particular, a dangerous goods identification of the biological material to be transported, and/or an identification of the sender. Any markings and/or labels may be located on at least one of the side/exterior walls 18 of the container casing 2, preferably on a side/exterior wall 18 of the bottom part 4 and/or on the outer packaging 3. However, such markings and/or labels may also be located on at least one of the side/outer walls of a possible outer package 3 of the container casing 2.

Figure 9A:
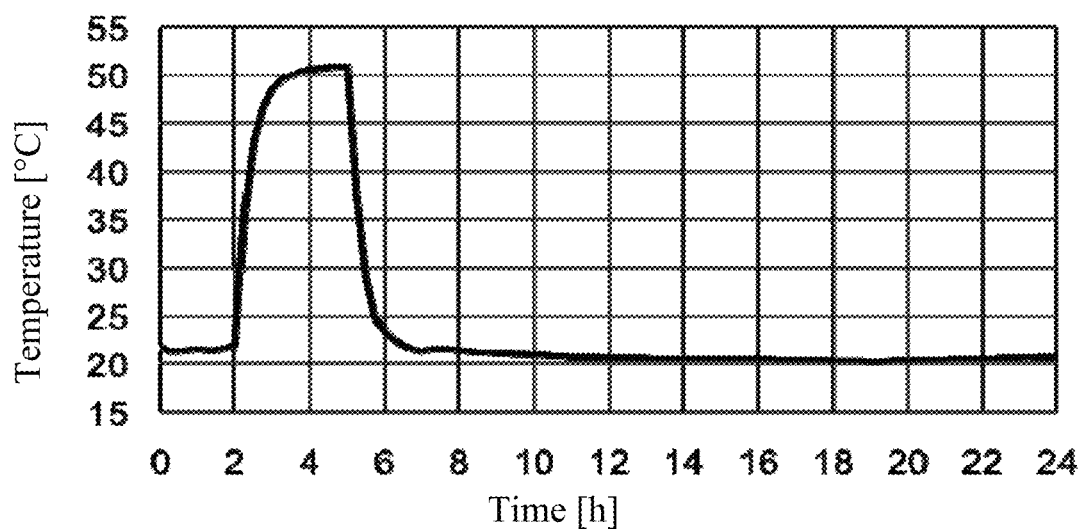
FIGS. 9A-9C show a comparison of the temperature change in a conventional cardboard box and in a container system according to the invention during heat stress.

The inventors exposed a conventional cardboard box and an exemplary container system according to the invention (Example 1) temporarily to heat stress (50° C.), and the temperature profiles were measured (Example 2). As shown in FIG. 9A, a rapid temperature rise to a maximum temperature of 50° C. was measured in the conventional cardboard box after temperature increase to 50° C. In the container system according to the invention, on the other hand, a slow temperature rise was observed, and the maximum temperature in the container interior space or in the area surrounded by the insulating portions was only 33° C., as compared to the maximum temperature of 50° C. in the conventional cardboard box. These results show the effectiveness of the container system according to the invention for buffering the temperature change in the container interior space caused by heat stress, and thus for ensuring the quality of the biological data determined from the biological material.

Figure 12A:
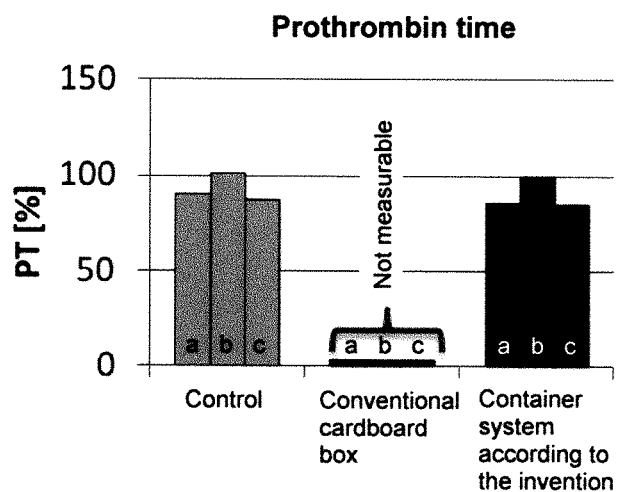
FIGS. 12A-12C show results from coagulation tests for temperature change during heat stress. Blood samples from three test persons were collected and then exposed to the heat stress according to FIG. 9, i.e., samples were packaged in a conventional cardboard box and a container system according to the invention, and the containers were kept at room temperature (22° C.) for two hours (2 h), and then subjected to a heat stress at 50° C. for three hours (3 h). The containers with the samples were then stored overnight at room temperature (22° C.), and coagulation tests were carried out after a total of 24 hours (24 h). A sample, which was stored 24h at room temperature (22° C.), served as a control. Tested were, inter alia, the following parameters: Prothrombin time (FIG. 12A), INR (Quick-value, prothrombin time) (FIG. 12B), activated partial thromboplastin time (PTT) (FIG. 12C). Blood samples from three different patients, a, b, and c, were studied.
Figure 12B:
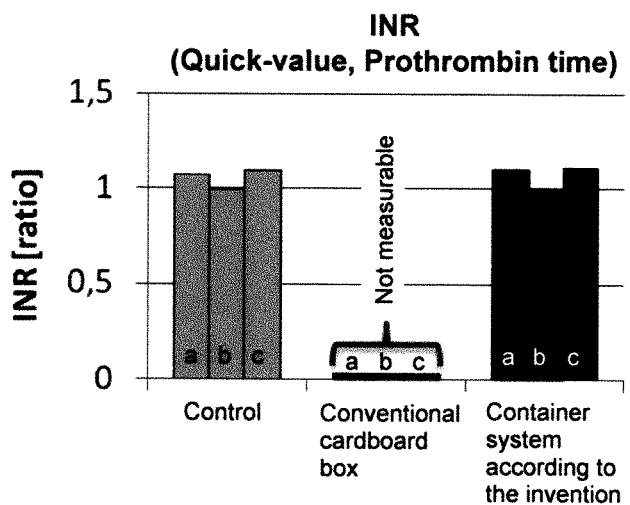
Figure 12C:
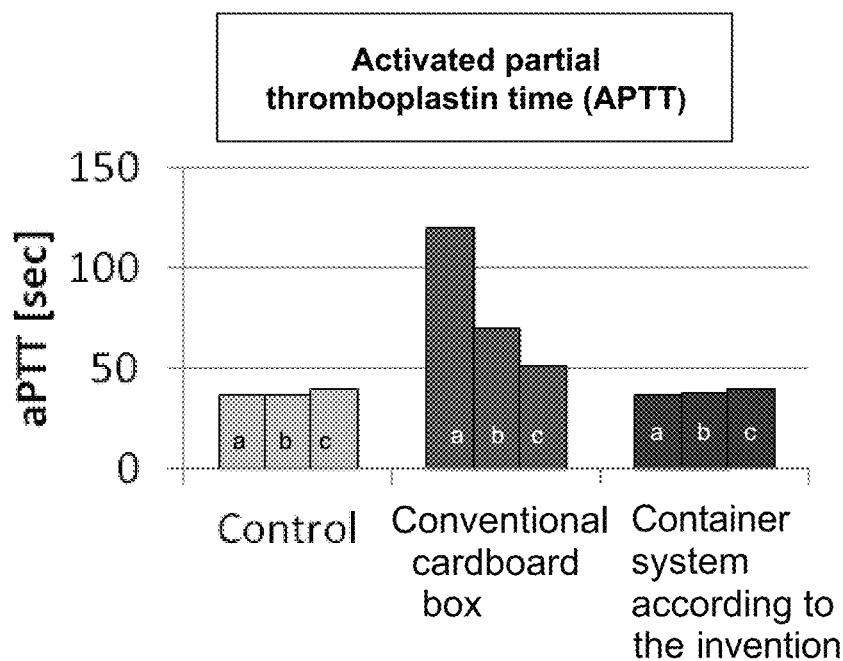

For studying clinical laboratory parameters in the case of heat stress, blood samples of three test persons were collected and exposed to the heat stress according to Example 2 (FIGS. 9A-9C) (Example 3). Surprisingly, it has been found that in case of heat stress, the blood samples in the container system according to the invention have a significantly better stability for all investigated hematological parameters (leukocytes, lymphocytes, monocytes, neutrophilic granulocytes, basophilic granulocytes, eosinophilic granulocytes, and platelets (thrombocytes)) than the blood samples of the conventional cardboard box. Furthermore, it has surprisingly been found that the blood samples in the container system according to the invention have a significantly better stability for all the investigated clinical-chemical parameters (lipase, GPT (ALT), and alkaline phosphatase, creatine kinase, creatine kinase MB; FIGS. 11A-11E) than the blood samples in the conventional cardboard box. Likewise, it has surprisingly been found that the blood samples in the container system according to the invention show a significantly better stability for all investigated coagulation parameters (prothrombin time, INR, activated partial thromboplastin time; FIGS. 12A-12C) than the blood samples in the conventional cardboard box. Surprisingly, for practically all the parameters under investigation, the stability of the blood samples in the container system according to the invention was virtually identical to the stability of the blood samples of the control. These results demonstrate the efficiency of the container system according to the invention for ensuring the stability of clinically relevant parameters in case of heat stress for the examination of blood samples, and thus for ensuring the quality of the biological data obtained from the biological material. These results show in particular that the container system according to the invention is suitable for the frequently heat stress-associated over-day transport of biological material, in particular blood samples.

The inventors have also temporarily exposed a conventional cardboard box and the exemplary container system according to the invention prepared in Example 1 to cold stress (−27° C.), and the temperature profiles have been measured (Example 4). As shown in FIG. 13, in the conventional cardboard box, a rapid temperature decrease to a temperature of −27° C. was measured. In the container system according to the invention, on the other hand, only a slow temperature decrease was observed, and the minimum temperature in the container interior space, or in the area surrounded by the insulating portion, was +4° C., compared to a temperature of −27° C. in the conventional cardboard box. This result shows the effectiveness of the container system according to the invention for buffering the temperature change induced by cold stress in the container interior space, and thus for ensuring the quality of the biological data determined from the biological material.

For the analysis of clinical laboratory parameters in case of cold stress, blood samples of three test persons were collected and exposed to the cold stress according to Example 4 (FIGS. 13A-13C) (Example 5). Surprisingly, it has been found that, in case of cold stress, the blood samples in the container system according to the invention show for all analyzed hematological parameters (leukocytes, lymphocytes, monocytes, neutrophilic granulocytes, basophilic granulocytes, eosinophilic granulocytes, erythrocytes, hemoglobin, hematocrit, mean corpuscular volume, mean corpuscular hemoglobin, mean corpuscular hemoglobin concentration, platelets; FIGS. 14A-14M) significantly better stability than the blood samples in the conventional cardboard box. Surprisingly, for practically all the parameters investigated, the stability of the blood samples in the container system according to the invention was virtually identical to the stability of the blood samples of the control. These results demonstrate the efficiency of the container system according to the invention for ensuring the stability of clinically relevant parameters in case of cold stress for the examination of blood samples, and thus for ensuring the quality of the biological data obtained from the biological material. These results show in particular that the container system according to the invention is suitable for the frequently cold stress-associated overnight transport of biological material, in particular blood samples.

The present invention also relates to the use of a container system 1 according to the invention for packaging biological material 12. In an advantageous embodiment, the insulating device 8 may be formed as a temperature-insulating gel cushion is adjusted to room temperature in the use according to the invention.

In one embodiment, room temperature means a temperature of 18° C.-27° C. In another embodiment, room temperature means a temperature of 20° C.-25° C. Preferably, room temperature means a temperature of 20° C.-25° C., more preferably a temperature of 21° C.-24° C. In other preferred embodiments, room temperature means a temperature of 21° C.-23° C. In a particularly preferred embodiment, room temperature means a temperature of 22° C.

The term "room temperature" is frequently also referred to as the ambient temperature, or the term "room temperature" is frequently understood to be the ambient temperature. Therefore, the terms "room temperature" and "ambient temperature" may be used synonymously in the present invention.

The present invention further provides methods for packaging biological material 12 for transport, comprising the steps of: (i) providing a container system 1 according to the present invention; and (ii) packing the biological material 12 to be transported between the insulating portions 14 of the insulating device 8 in the container casing 2.

An exemplary process sequence for packaging biological material 12 is shown in FIGS. 5-8. In step 1 (FIG. 5), the upper part 6 of the container casing 2 is removed and one of the two insulating sections 14 of the insulating device 8 is raised in order to uncover the closable receptacle 26 with the tube for accommodating biological material in the container interior space 10. The lifting of the corresponding insulating portion 14 is indicated by the arrow 28. The two insulating portions 14 are arranged to be foldable relative to each other. In step 2 (FIG. 6) the sealable receptacle 26 is removed, which is indicated by the arrows 30. The insulating device 14 is at least partly left in the container interior space 10. The biological material 12, which is picked up or collected in the tube, is put into the closable receptacle 26. In step 3 (FIG. 7), the closable receptacle 26 is returned to the container interior space 10, and covered again with the insulating portion 14 raised in step 1 (FIG. 5), indicated by the arrow 32 in FIG. 7. In step 4 (FIG. 8), the upper of the two insulating portions 14 is firmly pressed at all corners and/or sides (indicated by the arrows 34), so that the closable receptacle 26 is preferably completely enclosed and/or surrounded by the at least two insulating portions 14. Subsequently, the upper part 6 of the container casing 2 is placed onto the bottom part 4 in such a way that the container casing 2 is closed, indicated by the arrow 36.

The present invention also provides methods for transporting biological material, comprising the steps of: (i) providing a container system 1 according to the present invention; and (ii) packing the biological material 12 to be transported between the insulating portions 14 of the insulating device 8 in the container casing 2.

In one embodiment, the container system 1 according to the invention comprises a container casing 2 which consists of a bottom part 4 and a separate upper part 6 closing the bottom part 4, the upper part 6 being formed as a cover lid, while the bottom part 4 consists of four raised side walls 18 and a bottom wall 20 as a one-piece molded part. The container casing 2 is formed of polystyrene. The container casing 2 preferably has at least section-wise a wall thickness of 15 mm. The insulating device 8 is formed as a temperature-insulating gel cushion and has two insulating portions 14, each of which being formed by a gel chamber, wherein the two insulating sections 14 (gel chambers) are being formed integrally with one another, and an interruption section 16 is separating the two adjacent gel chambers, wherein the interruption section 16 itself is unfilled. The insulating sections are foldable relative to one another along the interruption section 16. Preferably, the interruption section 16 has a length of about 2 cm or about 1.5 cm. The shell of the two temperature-insulating gel chambers is composed of a thermoplastic resin, preferably polyethylene, more preferably LDPE, and the two gel chambers contain a water-based gel using polyacrylic acid as the main component of the gel matrix (gel matrix on polyacrylic acid basis). Preferably, the heat-insulating gel consists of polyacrylic acid, water and zeolites (crystalline aluminum silicates). More preferably, the heat-insulating gel consists of >=85% polyacrylic acid, water and zeolites; even more preferably the heat-insulating gel consists of >85% polyacrylic acid, water, zeolites and silicon dioxide, and particularly preferably, the heat-insulating gel consists of >=85% polyacrylic acid, water, <1% zeolite, and <0.5% silicon dioxide.

In another preferred embodiment, the container system 1 according to the invention is characterized by the following features: the insulating device 8 is formed as a temperature-insulating gel cushion and has two insulating portions 14, each of which being formed by a gel chamber, wherein the two insulating portions 14 (gel chambers) are integrally formed with one another. An interruption section 16 separates the two adjacent gel chambers. The two gel chambers are formed to be foldable along the interruption section 16. The shell of the two temperature-insulating gel chambers is composed of a thermoplastic resin, preferably polyethylene, more preferably LDPE, and the two gel chambers contain a water-based gel, using polyacrylic acid as the main component of the gel matrix (polyacrylic acid-based gel matrix >=85% polyacrylic acid). The interruption section 16 itself is unfilled. Preferably, the interruption section 16 has a length of about 2 cm or about 1.5 cm. Preferably, each of the two gel chambers has a height of approximately 14 mm, and a length of approximately 200 mm, and a width of approximately 140 mm. The container system 1 according to the invention described in this embodiment is furthermore characterized in that the container casing 2 is formed from polystyrene, and preferably has a wall thickness, at least section-wise, of 15 mm. In particular, the container casing 2 consists of a bottom part 4 and a separate upper part 6, which is closing the bottom part 4. The upper part 6 is formed as a cover lid, while the bottom part 4 is formed by four raised side walls 18 and a bottom wall 20 as a one-piece molded part. The four raised side walls 18 of the bottom part 4 preferably have a height of approximately 5 cm in the container interior space 10. Overall, the container casing 2 is rectangular shaped.

In various embodiments, the term "temperature-insulating" may be specified more specifically as "heat-insulating". In various embodiments, the term "temperature-insulating" may be specified more specifically as "cold-insulating".

In contrast to known transport containers, which are operated with dry ice as a temperature-insulating material, the container system 1 according to the invention for the transport of biological material 12 has the advantage that it can be quickly re-used without any special effort. For transport containers that are operated with dry ice, the insulating material must be refilled before the transport container can be used again. In the container system 1 of the present invention, only a cleaning of the container casing 2 and the insulating device 8 is necessary. This cleaning can be operated without any special effort. In contrast to known transport containers, in which the insulating material has to be replaced after the use of the container by new material, the container system 1 of the present invention has the additional advantage that it can be recycled, and thus makes a valuable contribution to sustainable waste management.

With respect to transport containers, which are operated with electric heating or cooling devices for maintaining a certain temperature in the container interior space, the container system 1 according to the invention for transporting biological material 12 has the advantage of safety against a technical failure of the insulating device. Known transport containers operated with electrical devices are susceptible to failure of such separately operated devices. This is not the case with the container system 1 of the present invention. Furthermore, no additional energy expenditure for electrical operation is required for the container system of the present invention. In contrast to known transport containers, which are operated with electric heating or cooling devices, the container system 1 of the present invention thus has the additional advantage that less energy input is required.

In contrast to known transport containers, which are operated with dry ice or electric heating or cooling devices, the container system 1 of the present invention has the additional advantage that it is a light packaging, which entails advantages in handling and with reduced freight charges for transportation, respectively.

In the following, the invention is described, without limiting the general idea of the invention, by means of exemplary embodiments with reference to the figures.

EXAMPLES

Example 1: Production of an Exemplary Container System According to the Invention An exemplary container system 1 according to the invention has been produced, which is characterized by the following features: the insulating device 8 is formed as a temperature-insulating gel cushion and has two insulating portions 14, each formed by a gel chamber, wherein the two insulating portions 14 (gel chambers) are formed as one-piece. An interruption section 16 separates the two adjacent gel chambers. The two gel chambers are formed to be foldable along the interruption section 16. The shell of the two temperature-insulating gel chambers consists of a thermoplastic resin, polyethylene (LDPE), and the two gel chambers contain a water-based gel using polyacrylic acid as the main component of the gel matrix (polyacrylic acid-based gel matrix; >=85% polyacrylic acid). The interruption section 16 itself is unfilled. The interruption section 16 has a length of about 2 cm. Each of the two gel chambers has a height of approximately 14 mm, with a length of approximately 200 mm, and a width of approximately 140 mm. The container system 1 according to the invention produced in this example is further characterized in that the container casing 2 is formed of (foamed) polystyrene, and at least section-wise has a wall thickness of 15 mm. In particular, the container casing 2 consists of a bottom part 4 and a separate upper part 6 which closes the bottom part 4. The upper part 6 is formed as a cover lid, while the bottom part 4 is formed by four raised side walls 18 and a bottom wall 20 as a one-piece molded part. The four raised side walls 18 of the bottom part 4 have a height of approximately 5 cm in the container interior space 10. Overall, the container housing 2 is rectangular shaped.

Figure 4:
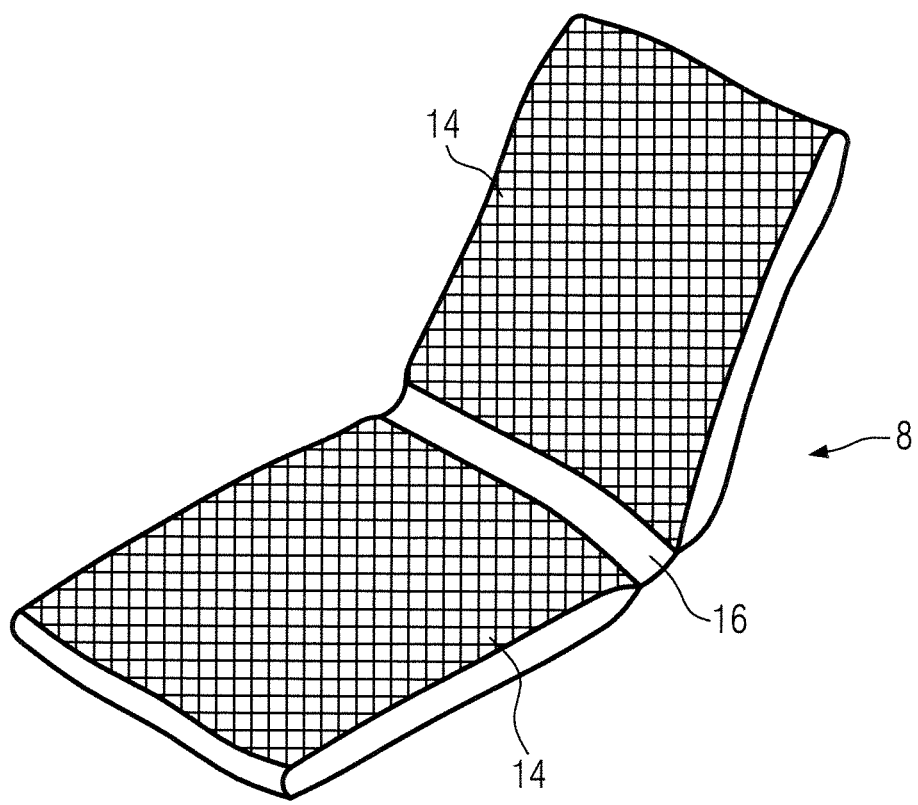
FIG. 4 shows an insulating device 8 of a container system according to an embodiment of the present invention.
Figure 5:
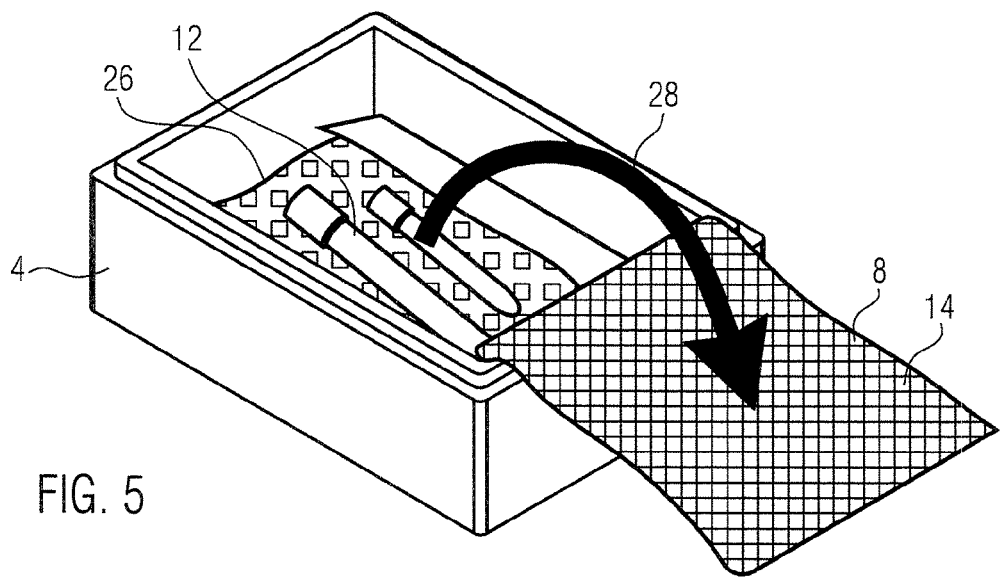
FIGS. 5 to 8 show an exemplary embodiment of the method according to the invention for packaging a biological sample in an exemplary container system according to the invention.
Figure 6:
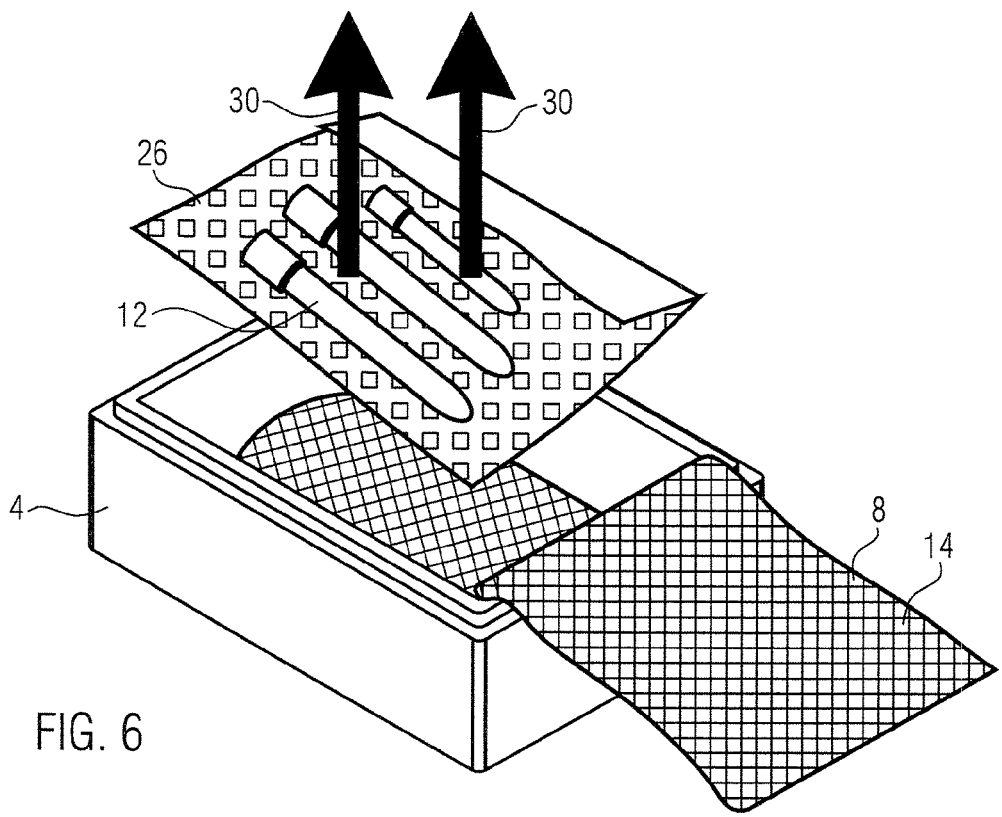
Figure 7:
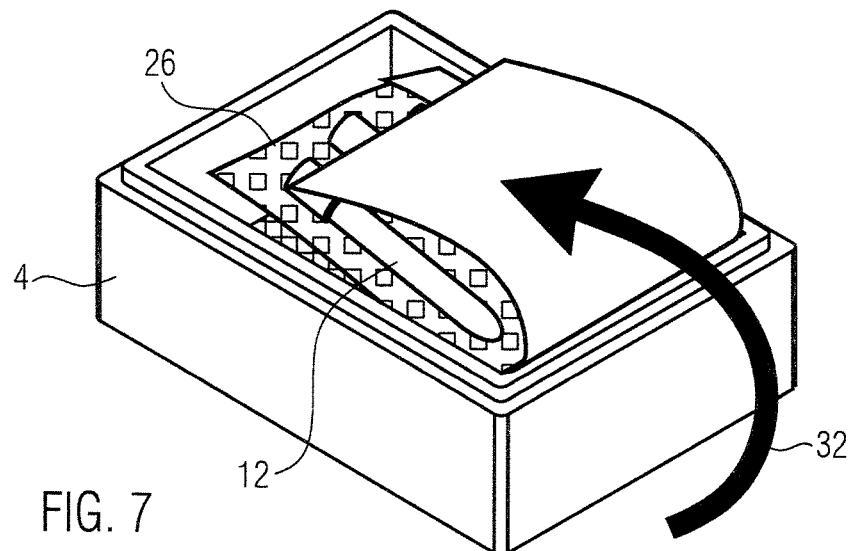
Figure 8:
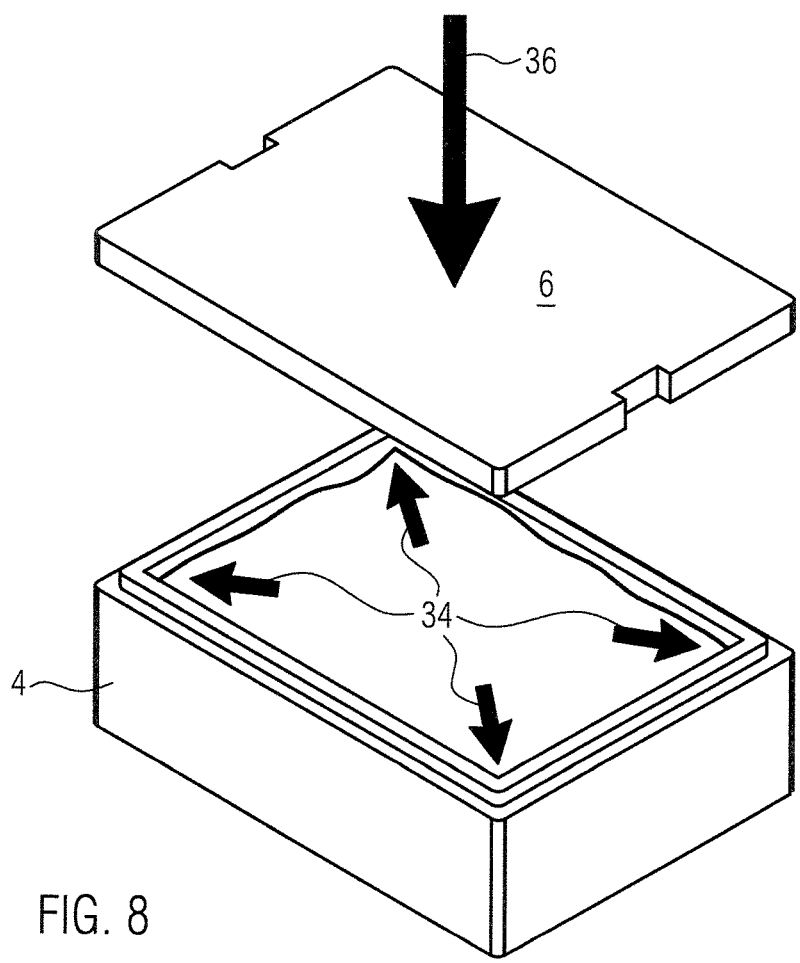

The exemplary container system according to the invention produced in Example 1 is shown in FIG. 1 and comprises the container casing 2 with the upper part 6 and the bottom part 4 (as shown in FIGS. 2 and 3), and the insulating device 8 (as shown in FIG. 4). The exemplary container system according to the invention produced in Example 1 does not comprise the outer package 3.

Example 2: Temperature Profiles in Case of Heat Stress (50° C.)

Figure 9B:
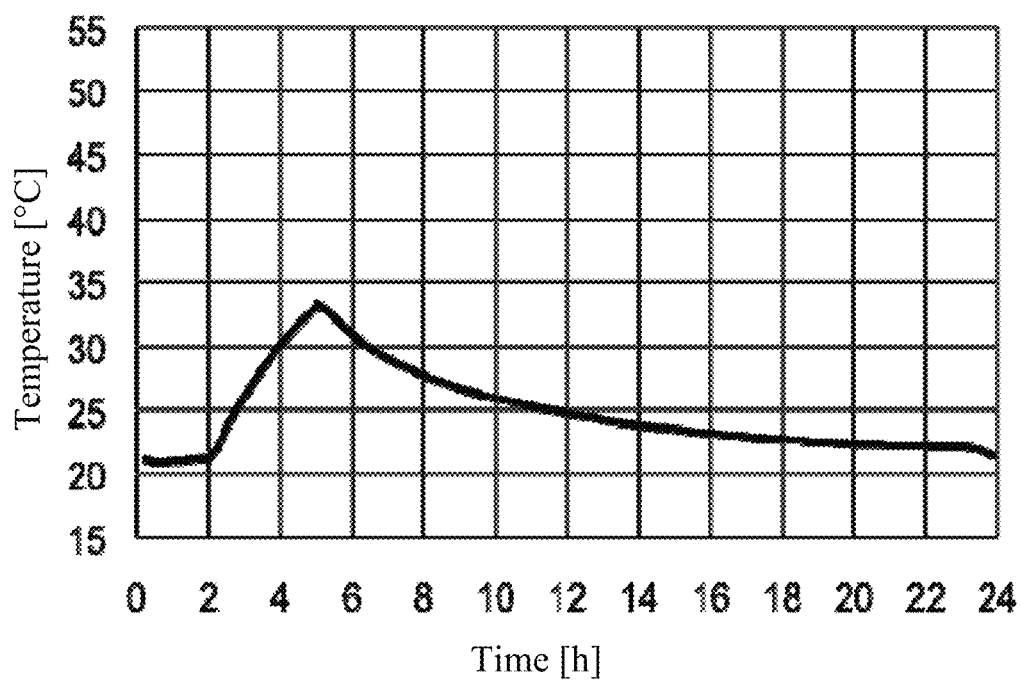
Figure 9C:
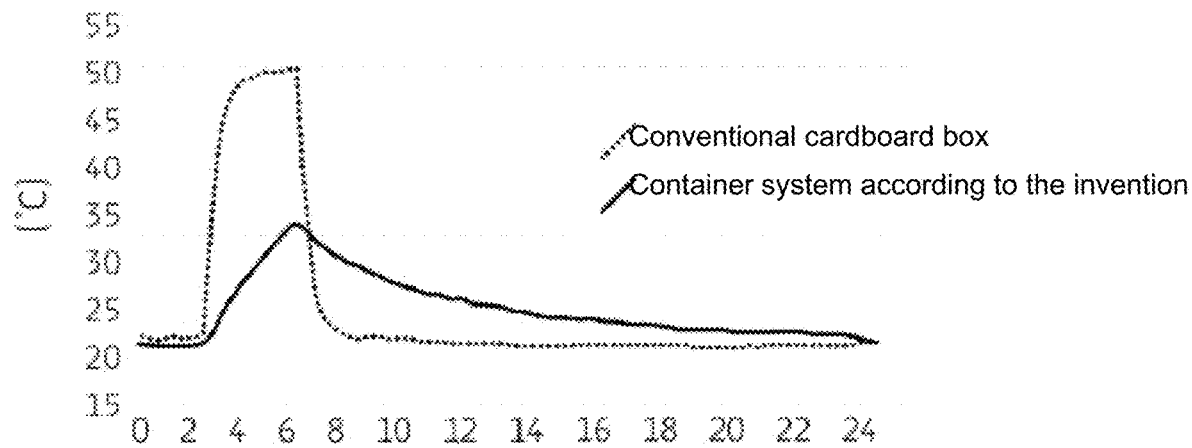
Figure 10A:
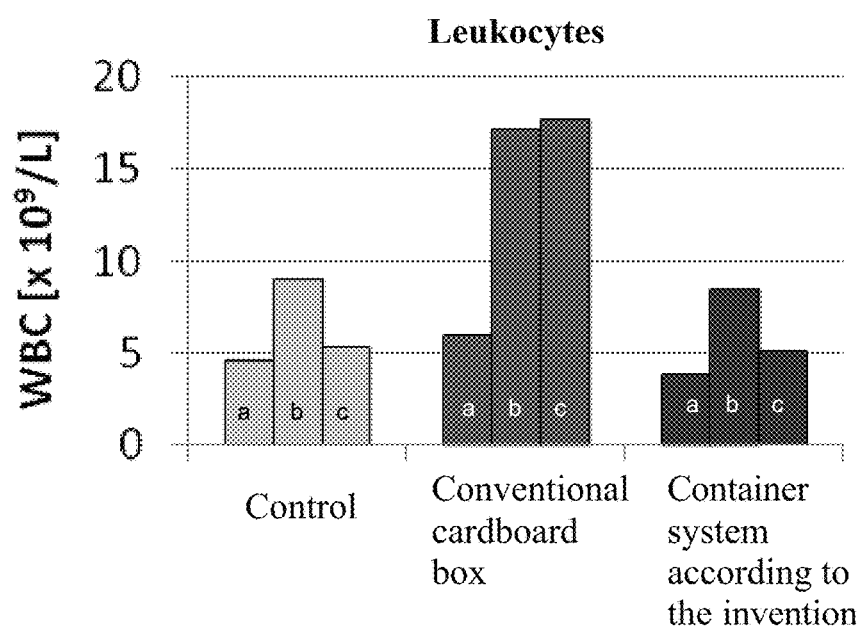
FIGS. 10A-10G show results from hematological evaluations (blood tests) for temperature change during heat stress. Blood samples from three test persons were collected and then exposed to the heat stress according to FIG. 9, i.e., samples were packaged in a conventional cardboard box and a container system according to the invention, and the containers were kept at room temperature (22° C.) for two hours (2 h), and then subjected to a heat stress at 50° C. for three hours (3 h). The containers with the samples were then stored overnight at room temperature (22° C.), and a blood test was carried out after a total of 24 hours (24 h). A sample, which was stored for 24 h at room temperature (22° C.) served as a control. Tested were, inter alia, the following parameters: Leukocytes (FIG. 10A), lymphocytes (FIG. 10B), monocytes (FIG. 10C), neutrophilic granulocytes (FIG. 10D), basophilic granulocytes (FIG. 10E), eosinophilic granulocytes (FIG. 10F), platelets (thrombocytes) (FIG. 10G). Blood samples from three different patients, a, b, and c, were studied.
Figure 10B:
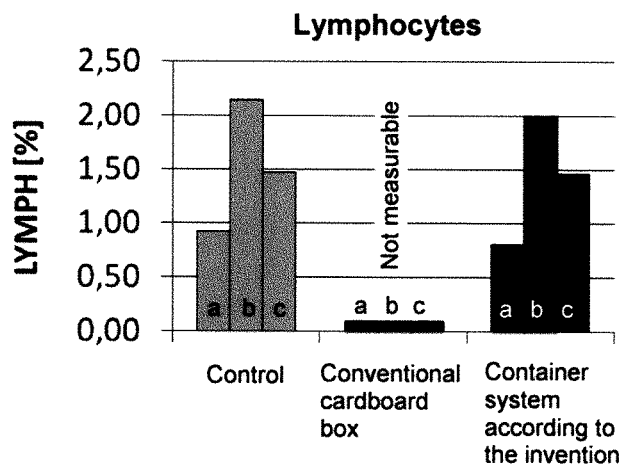
Figure 10C:
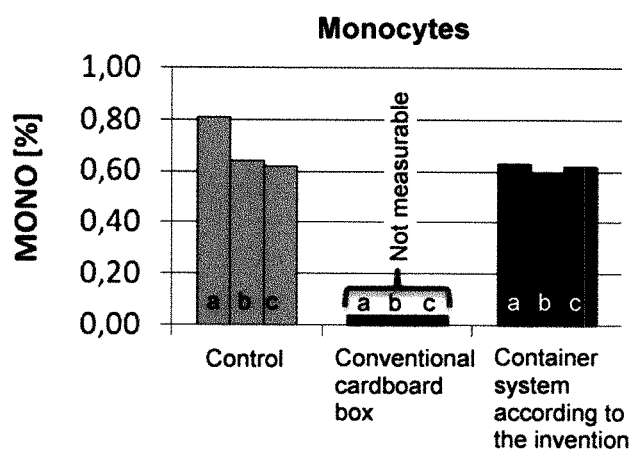
Figure 10D:
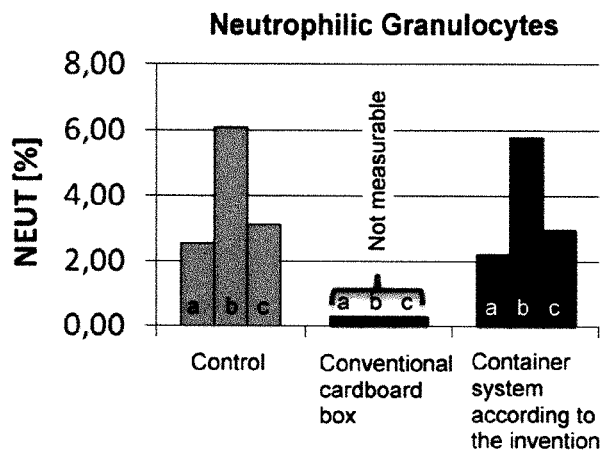
Figure 10E:
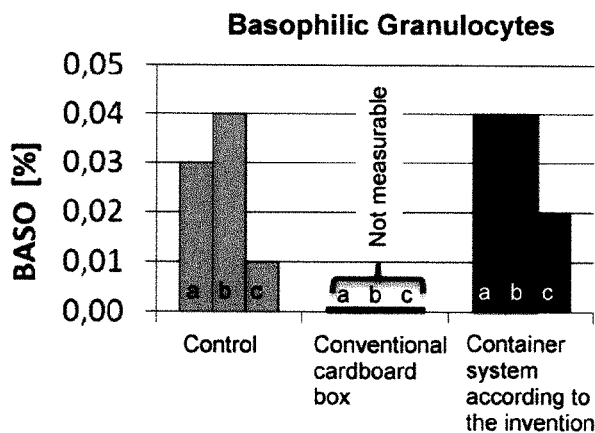
Figure 10F:
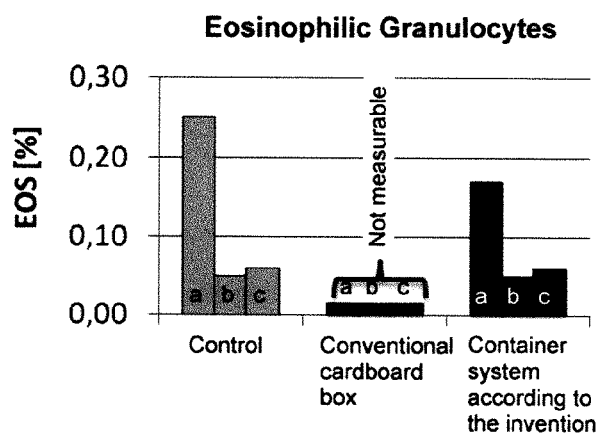
Figure 10G:
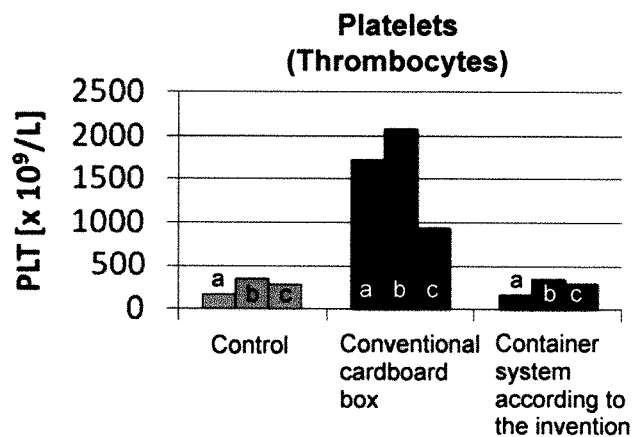
Figure 11A:
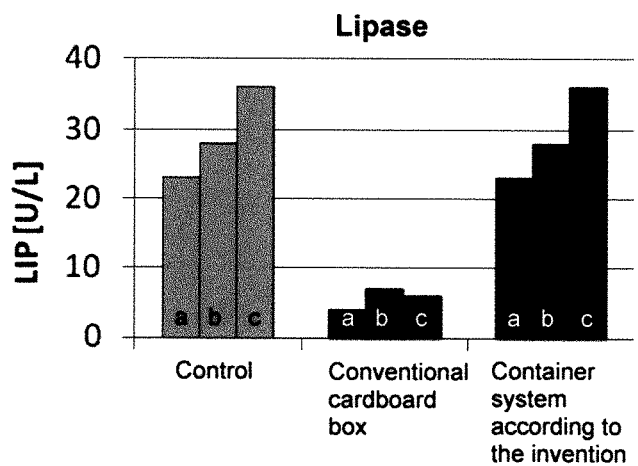
FIGS. 11A-11E show results from investigations of clinical chemical parameters for temperature change during heat stress. Blood samples from three test persons were collected and then subjected to the heat stress according to FIG. 9, i.e., samples were packaged in a conventional cardboard box and a container system according to the invention, and the containers were kept at room temperature (22° C.) for two hours (2 h), and then subjected to a heat stress at 50° C. for three hours (3 h). The containers with the samples were then stored overnight at room temperature (22° C.), and after a total of 24 hours (24 h), investigations of clinical-chemical parameters were performed. A sample, which was stored for 24 h at room temperature (22° C.), served as a control. Tested were, inter alia, the following clinical-chemical parameters: Lipase (FIG. 11A), GPT (glutamate pyruvate transaminase) (also known as ALT, alanine aminotransferase) (FIG. 11B), alkaline phosphatase (FIG. 11C), creatine kinase (FIG. 11D), creatine kinase MB (myocard type) (FIG. 11E). Blood samples from three different patients, a, b, and c, were studied.
Figure 11B:
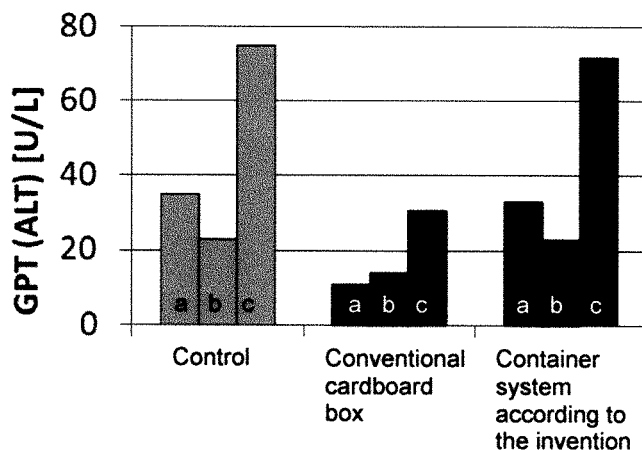
Figure 11C:
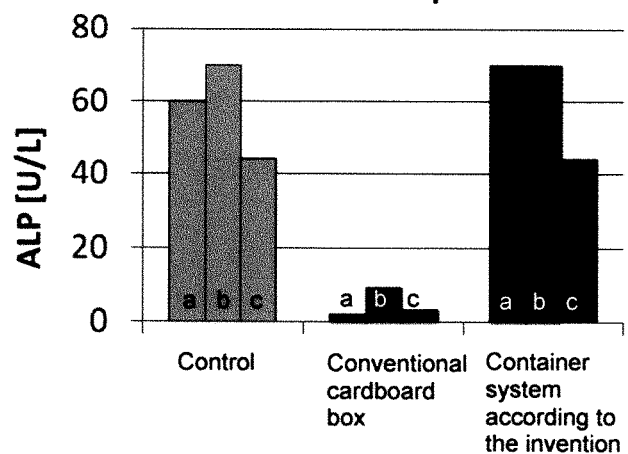
Figure 11D:
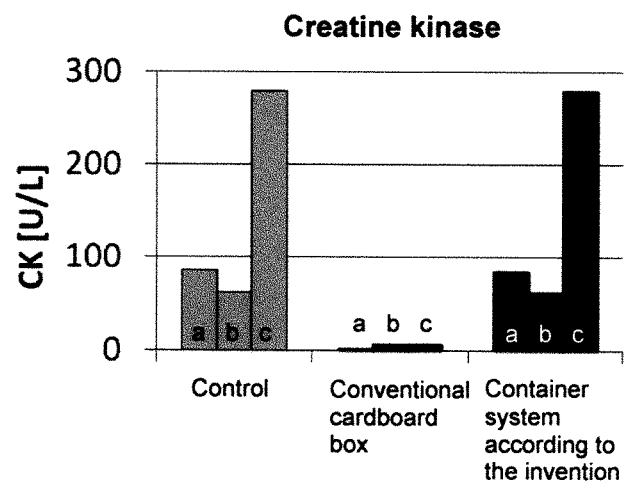
Figure 11E:
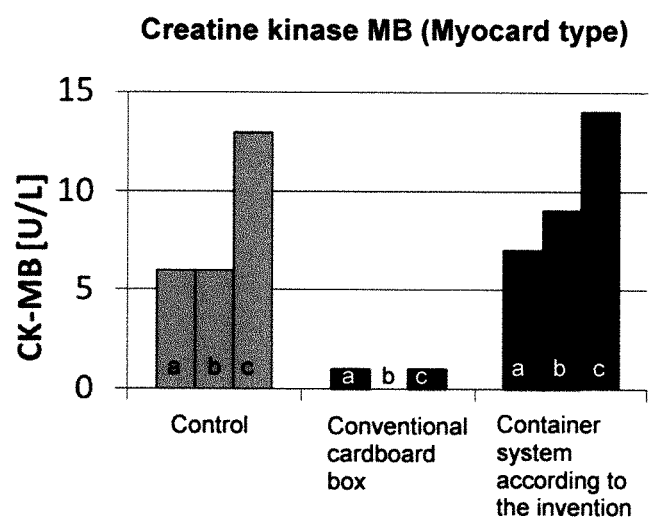

A conventional cardboard box and the container system 1 according to the invention described in Example 1 were temporarily subjected to heat stress, and the temperature profiles were measured. At the time point t=0 h, a conventional cardboard box and a container system according to the invention were present at room temperature (22° C.). At time point t=2 h, the temperature was raised to 50° C. in both cases for 3 hours (3 h). The temperature was then lowered again to room temperature (22° C.), and both batches were stored (incubated) until t=24 h at this temperature. The results are shown in FIGS. 9A-9C. In the conventional cardboard box, a rapid temperature rise to a maximum temperature of 50° C. was measured after temperature increase to 50° C. In the container system according to the invention, on the other hand, a slow temperature rise was observed, and the maximum temperature in the container interior was only 33° C., as compared to the maximum temperature of 50° C. in the conventional cardboard box.

This result shows the effectiveness of a container system according to the invention for buffering the temperature change in the container interior space caused by heat stress, and thus for ensuring the quality of the biological data determined from the biological material.

Example 3: Investigations of Clinical Laboratory Parameters in Case of Heat Stress (50° C.)

Blood samples from three test persons were collected and exposed to the heat stress of Example 1 (FIGS. 9A-9C), i.e., the samples were each packaged in a conventional cardboard box and in the container system 1 according to the invention described in Example 1, and the containers were kept at room temperature (22° C.) for two hours (2 h), and then subjected to a heat stress at 50° C. for three hours (3 h). The containers with the samples were then stored overnight at room temperature (22° C.), and after a total of 24 hours (24 h), an examination of hematological, clinical-chemical and coagulation parameters was carried out. The results are shown in FIGS. 10, 11 and 12, respectively.

Surprisingly, it has been found that the blood samples in the container system according to the invention have significantly better stability for all investigated hematological parameters (leukocytes, lymphocytes, monocytes, neutrophilic granulocytes, basophilic granulocytes, eosinophilic granulocytes, and platelets (thrombocytes); FIGS. 10A-10G) than the blood samples in the conventional cardboard box. The increase in the number of leukocytes and platelets shown in FIGS. 10A and 10G, respectively, is only an apparent increase; the cells change their form by the temperature stress, and therefore it appears in the flow cytometry as if the number of the cells has increased.

Furthermore, it has surprisingly been found that the blood samples in the container system according to the invention have significantly better stability for all the investigated clinical-chemical parameters (lipase, GPT (ALT), and alkaline phosphatase, creatine kinase, creatine kinase MB; FIGS. 11A-11E) than the blood samples in the conventional cardboard box.

Also, it has surprisingly been found that the blood samples in the container system according to the invention show a significantly better stability for all investigated coagulation parameters (prothrombin time, INR, activated partial thromboplastin time, FIGS. 12A-12C) than the blood samples in the conventional cardboard box.

The stability of the blood samples in the container system according to the invention was surprisingly virtually identical to the stability of the blood samples of the control example for practically all the parameters under investigation.

This result demonstrates the effectiveness of the container system according to the invention for ensuring the stability of clinically relevant parameters for the examination of blood samples, and thus for ensuring the quality of the biological data determined from the biological material.

This result shows in particular that the container system according to the invention is suitable for the frequently heat stress-associated over-day transport of biological material, in particular blood samples.

Example 4: Temperature Profiles in Case of Cold Stress (−27° C.)

Figure 13A:
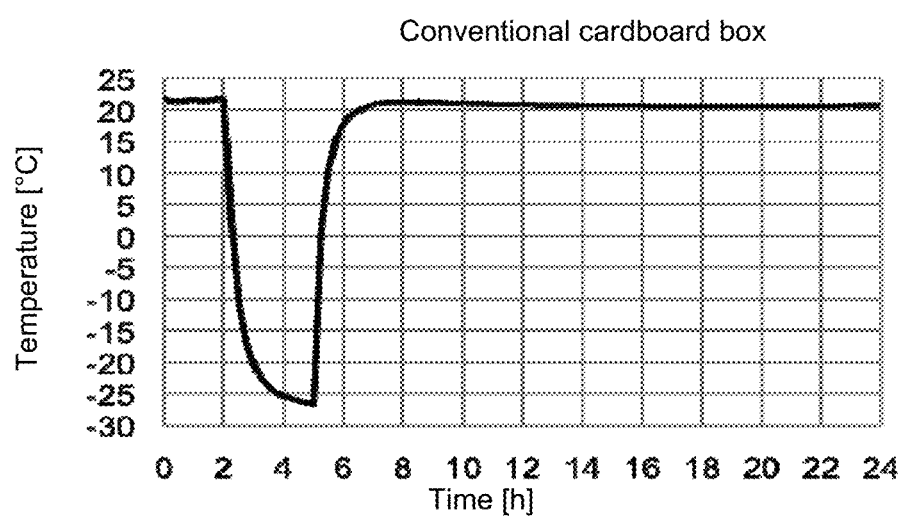
FIGS. 13A-13C show a comparison of the temperature change in a conventional cardboard box and in a container system according to the invention during cold stress.
Figure 13B:
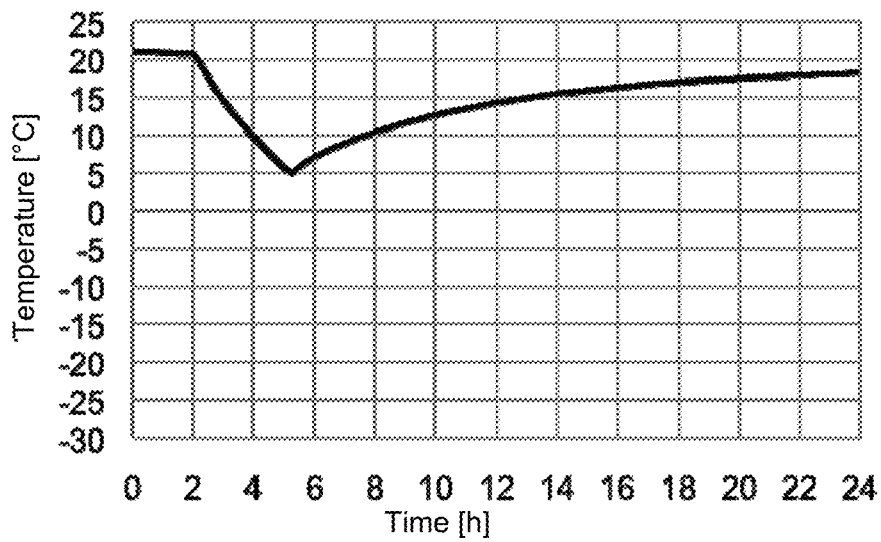
Figure 13C:
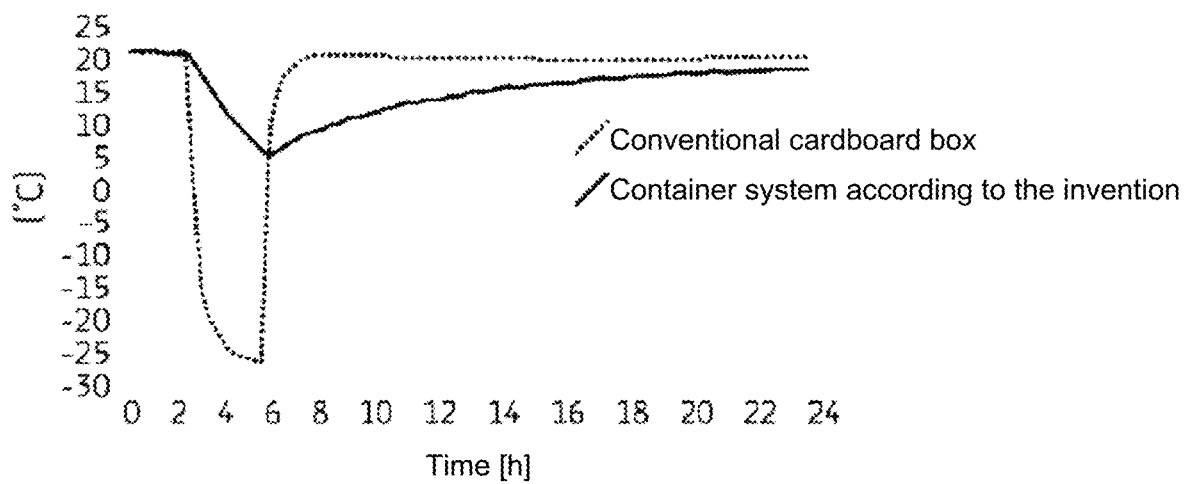
Figure 14A:
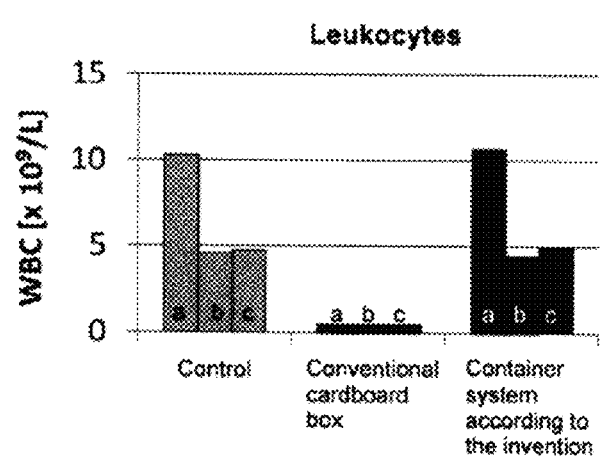
FIGS. 14A-14M show results from hematological evaluations (blood tests) for the temperature change during cold stress. Blood samples from three cold test person were collected and then exposed to the cold stress according to FIG. 13, i.e., samples were packaged in a conventional cardboard box and a container system according to the invention, and the containers were kept at room temperature (22° C.) for two hours (2 h), and then subjected to a cold stress at minus 27° C. (−27° C.) for three hours (3 h). The containers with the samples were then stored overnight at room temperature (22° C.), and blood tests were carried out after a total of 24 hours (24 h). A sample, which was stored for 24 h at room temperature (22° C.), served as a control. Tested were, inter alia, the following parameters: Leukocytes (FIG. 14A), lymphocytes (FIG. 14B), monocytes (FIG. 14C), neutrophilic granulocytes (FIG. 14D), basophilic granulocytes (FIG. 14E), eosinophilic granulocytes (FIG. 14F), erythrocytes (FIG. 14G), hemoglobin (FIG. 14H), hematocrit (FIG. 14I), mean corpuscular volume, MCV (FIG. 14J), mean corpuscular hemoglobin, MCH (FIG. 14K), mean corpuscular hemoglobin concentration, MCHC (FIG. 14L), platelets (thrombocytes) (FIG. 14M). Blood samples from three different patients, a, b, and c, were studied.
Figure 14B:
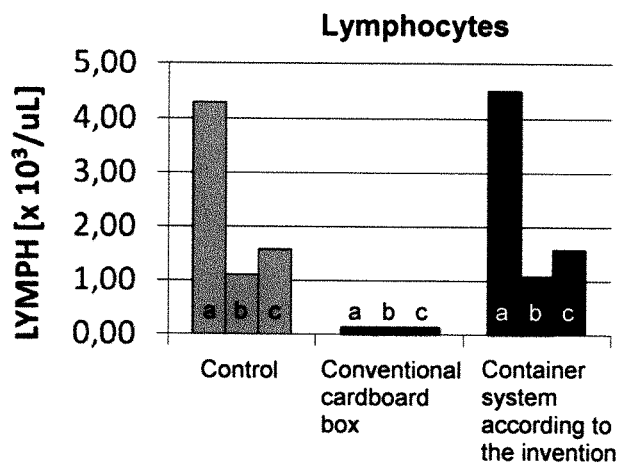
Figure 14C:
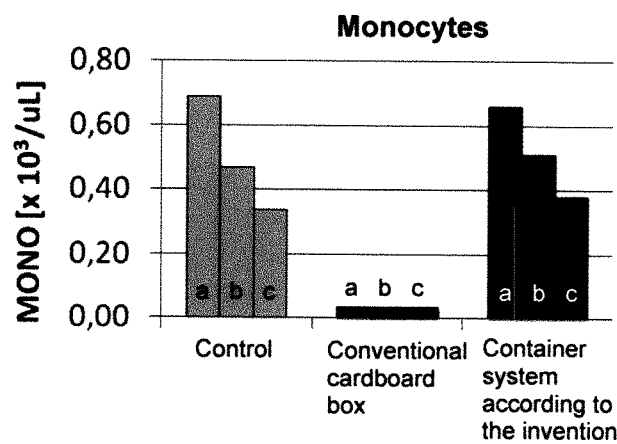
Figure 14D:
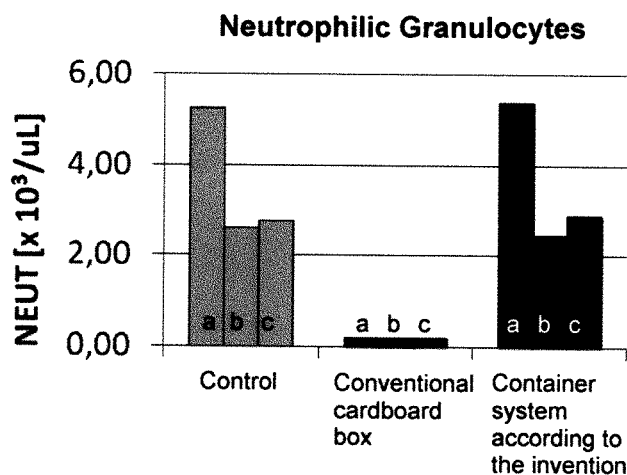
Figure 14E:
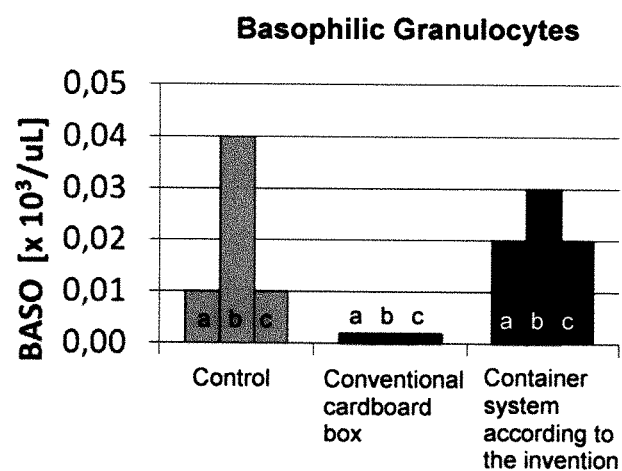
Figure 14F:
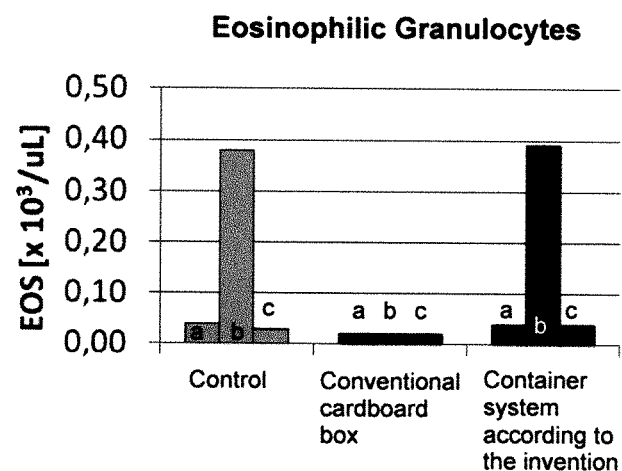
Figure 14G:
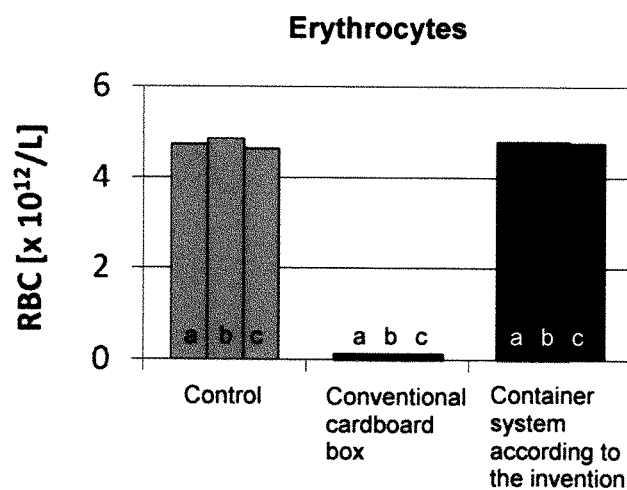
Figure 14H:
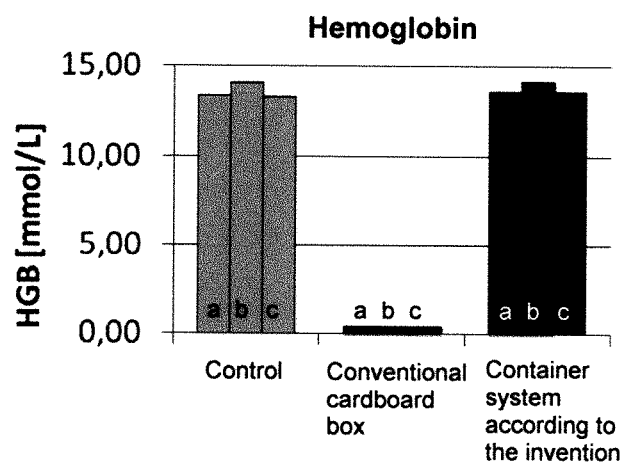
Figure 14I:
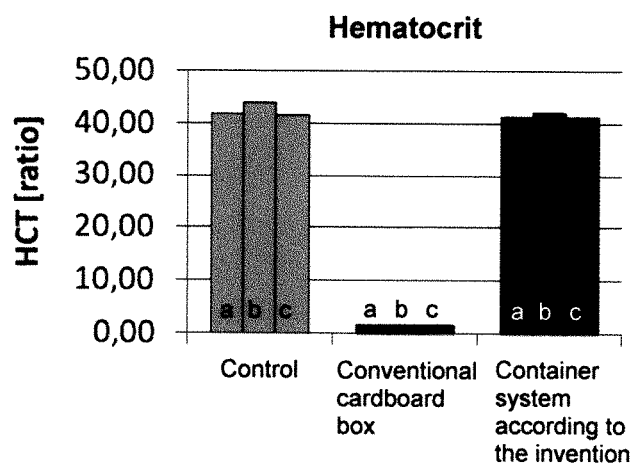
Figure 14J:
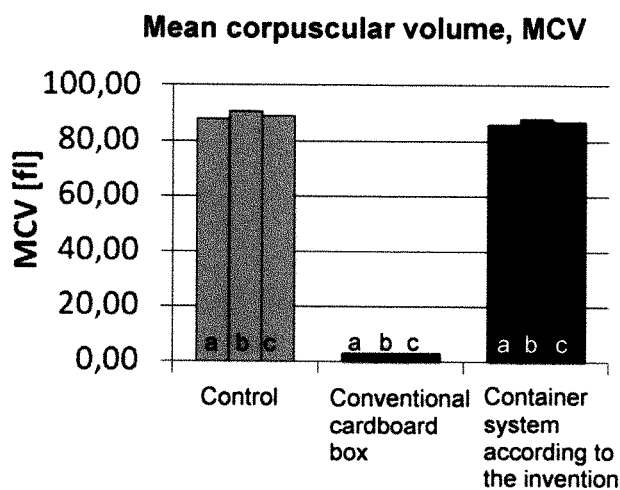
Figure 14K:
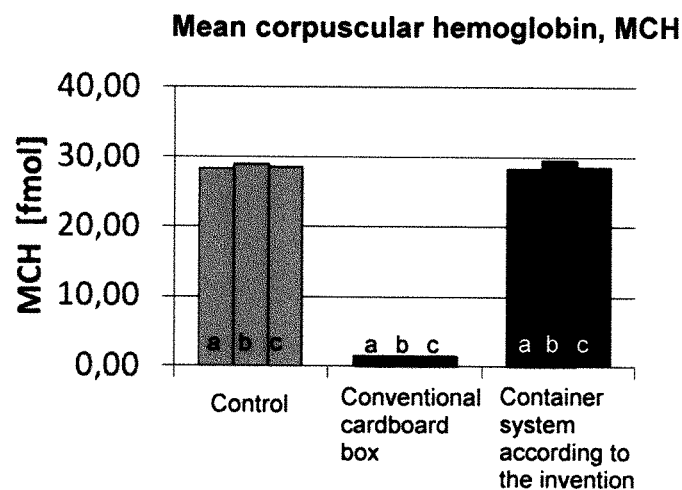
Figure 14L:
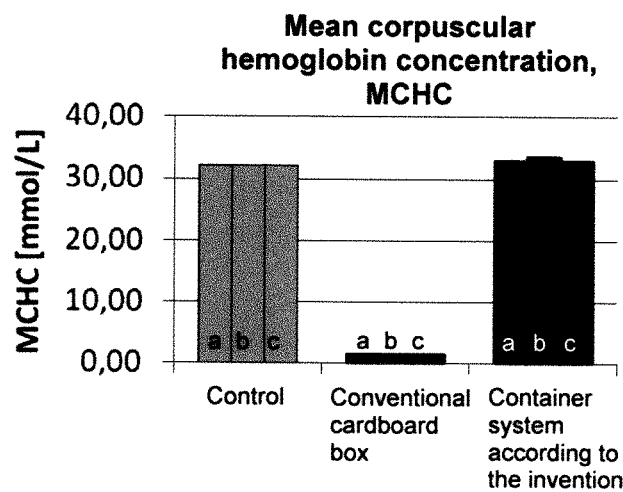
Figure 14M:
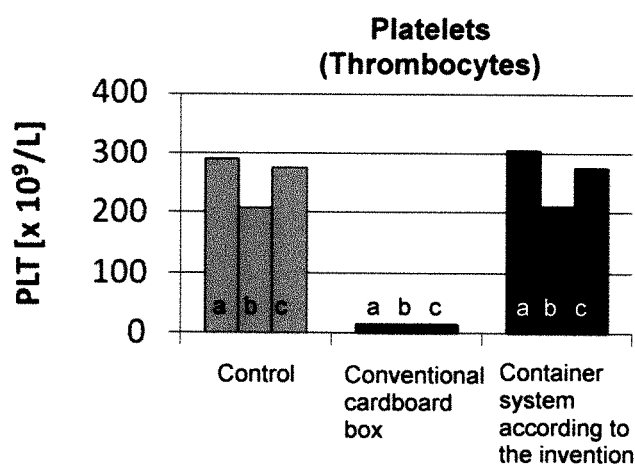

A conventional cardboard box and the container system 1 according to the invention described in Example 1 were temporarily exposed to cold stress, and the temperature profiles were measured. At the time point t=0 h, a conventional cardboard box and a container system according to the invention were present at room temperature (22° C.). At time point t=2 h, the temperature was lowered to minus 27° C. (−27° C.) in both cases for a period of three hours (3 h). The temperature was then raised again to room temperature (22° C.), and both batches were stored (incubated) until t=24 h at this temperature. The results are shown in FIGS. 13A-13C. In the conventional cardboard box, a rapid temperature decrease was measured to a minimum temperature of −27° C. In the container system according to the invention, only a slow temperature decrease was observed, and the minimum temperature in the container interior was plus 4° C. (+4° C.), compared to the minimum temperature of −27° C. in the conventional cardboard box.

This result shows the effectiveness of the container system according to the invention for buffering the temperature change induced by cold stress in the container interior space, and thus for ensuring the quality of the biological data determined from the biological material.

Example 5: Investigations of Clinical Laboratory Parameters in Cold Stress (−27° C.)

Blood samples from three test persons were collected and exposed to the cold stress of Example 4 (FIGS. 13A-13C), i.e., the samples were each packaged in a conventional cardboard box and in the container system 1 according to the invention described in Example 1, and the containers were kept at room temperature (22° C.) for two hours (2 h), and then subjected to cold stress at −27° C. for three hours (3 h). The containers with the samples were then stored overnight at room temperature (22° C.), and after a total of 24 hours (24 h) an examination of hematological parameters was carried out. The results are shown in FIGS. 14A-14M.

Surprisingly, it has been found that the blood samples in the container system according to the invention have a better stability for all investigated hematological parameters (leukocytes, lymphocytes, monocytes, neutrophilic granulocytes, basophilic granulocytes, eosinophilic granulocytes, erythrocytes, hemoglobin, hematocrit, mean corpuscular volume, mean corpuscular hemoglobin, hemoglobin concentration, platelets; FIGS. 14A-14M) than the blood samples in the conventional cardboard box.

The stability of the blood samples in the container system according to the invention was surprisingly virtually identical to the stability of the blood samples of the control example for practically all the parameters under investigation.

This result demonstrates the effectiveness of the container system according to the invention for ensuring the stability of clinically relevant parameters for the examination of blood samples, and thus for ensuring the quality of the biological data determined from the biological material.

This result shows in particular that the container system according to the invention is suitable for the frequently cold stress-associated overnight transport of biological material, in particular blood samples.

REFERENCE SIGN LIST 1 container system
2 container casing
3 outer packaging
4 bottom part
6 upper part
8 insulating device
10 container interior space
12 biological material
14 insulating portion
16 interruption section
18 side/outside wall
20 bottom wall
22 circumferential recess
24 circumferential projection
26 closable receptacle

The invention claimed is:

1. A container system for transport of biological material comprising:
   a container casing formed of a temperature-insulating polymer material, and
   an insulating device,
   wherein the container casing defines a container interior space for accommodation of the insulating device and for accommodation of biological material to be transported,
   and wherein the insulating device consists of two insulating portions, which form a single layer surrounding the biological material inside the container interior space, wherein the two insulating portions are formed as a temperature-insulating gel cushion, wherein the two insulating portions contain a hydrocolloidal material, wherein the two insulating portions are connected to each other and/or are formed integrally with each other, and wherein the two insulating portions are foldable relative to each other along an interruption section.

2. The container system according to claim 1, wherein the insulating portions are each formed by at least one gel chamber, and/or wherein the two insulating portions are each positionable along a plane, and/or wherein the interruption section separates two gel chambers adjacent to each other, and/or wherein the interruption section is unfilled or has at least a lower filling degree than at least one of the gel chambers.

3. The container system according to claim 2, wherein the temperature-insulating gel cushion comprises a shell made of a thermoplastic resin and the two insulating portions are gel chambers containing the hydrocolloidal material.

4. The container system according to claim 1, wherein the container casing is formed of foamed polystyrene or polyurethane.

5. The container system according to claim 1, wherein the container casing has at least section-wise a wall thickness of 10 to 20 mm and/or wherein the container interior space is sized to correspond substantially to dimensions of the insulating device in order to keep the insulating device and/or the insulating portions positionally secure.

6. The container system according to claim 1, wherein the container casing consists of at least one bottom part and at least one upper part closing the at least one bottom part, wherein the at least one bottom part and the at least one upper part are separate or integrally connected elements.

7. The container system according to claim 6, wherein the at least one upper part is formed with a recess, at least section-wise extending circumferentially, for receiving an at least section-wise circumferentially extending projection of the at least one bottom part, and/or wherein the at least one bottom part is formed with a projection, at least section-wise extending circumferentially, for engaging in a recess of the at least one upper part, at least section-wise extending circumferentially.

8. The container system according to claim 1, further comprising a closable receptacle for at least one biological material to be transported.

9. The container system according to claim 1, wherein the temperature-insulating gel cushion is at room temperature.

10. The container system according to claim 1 wherein the biological material is a sample of human or animal blood, plasma, serum, sputum, saliva, liquor, urine, or other body fluids or tissues.

11. The container system according to claim 3, wherein the temperature-insulating gel cushion comprises a shell made of polyethylene.

12. The container system according to claim 3, wherein the hydrocolloidal material is a water-based gel comprising polyacrylic acid, aluminum silicates and/or methylcellulose.

13. The container system according to claim 8, wherein the closable receptacle and/or the two insulating portions is/are sized such that the two insulating portions at least partially cover the closable receptacle.

14. The container system according to claim 8, wherein the closable receptacle and/or the two insulating portions is/are sized such that the closable receptacle is completely surrounded by the two insulating portions.

15. A method for packaging biological material for transport comprising:
   providing a container system according to claim 1; and
   packing the biological material to be transported between the insulating portions of the insulating device in the container casing.

16. The method for packaging biological material for transport according to claim 15, wherein the biological material is a sample of human or animal blood, plasma, serum, sputum, saliva, liquor, urine, or other body fluids or tissues.

* * * * *